United States Patent
Ito et al.

(10) Patent No.: US 10,432,862 B2
(45) Date of Patent: Oct. 1, 2019

(54) IMAGING APPARATUS, IMAGE PROJECTOR APPARATUS, AND STAGE APPARATUS

(71) Applicant: RICOH IMAGING COMPANY, LTD., Tokyo (JP)

(72) Inventors: Eiichi Ito, Chiba (JP); Masahiro Inazuka, Saitama (JP); Kosei Kosako, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 71 days.

(21) Appl. No.: 15/361,190

(22) Filed: Nov. 25, 2016

(65) Prior Publication Data

US 2017/0155816 A1 Jun. 1, 2017

(30) Foreign Application Priority Data

Nov. 30, 2015 (JP) ................................ 2015-232908
Nov. 22, 2016 (JP) ................................ 2016-226905

(51) Int. Cl.
*H04N 5/232* (2006.01)
*H04N 9/31* (2006.01)

(52) U.S. Cl.
CPC ....... *H04N 5/2328* (2013.01); *H04N 5/23258* (2013.01); *H04N 5/23287* (2013.01); *H04N 9/317* (2013.01)

(58) Field of Classification Search
CPC .......................... H04N 5/2328; H04N 5/23287
See application file for complete search history.

(56) References Cited

U.S. PATENT DOCUMENTS

| 5,157,563 A | 10/1992 | Nagasawa et al. |
| 7,826,732 B2 | 11/2010 | Enomoto |

(Continued)

FOREIGN PATENT DOCUMENTS

| JP | 59-11071 A | 1/1984 |
| JP | H02-154313 A | 6/1990 |

(Continued)

OTHER PUBLICATIONS

U.S. Appl. No. 15/362,059 to Eiichi Ito, filed Nov. 28, 2016.
U.S. Appl. No. 15/435,352 to Eiichi Ito, filed Feb. 17, 2017.
U.S. Appl. No. 15/434,483 to Eiichi Ito, filed Feb. 16, 2017.

*Primary Examiner* — Christopher K Peterson
(74) *Attorney, Agent, or Firm* — Greenblum & Bernstein, P.C.

(57) ABSTRACT

An imaging apparatus includes a photographing optical system, an image sensor onto which an object image is projected through the photographing optical system, a movable member to which the image sensor is fixed, a base member which holds the movable member in a manner to allow the movable member to move relative to the base member, and a thrust generator which generates thrust forces in different directions, including first through third directions, the first direction being parallel with the optical axis direction of the photographing optical system. An interaction of the thrust forces against the movable member in at least one of the different directions causes the movable member to at least one of translate relative to the base member in the first through third directions, and/or rotate relative to the base member about the first through third directions.

19 Claims, 15 Drawing Sheets

(56) References Cited

U.S. PATENT DOCUMENTS

| | | |
|---|---|---|
| 9,288,394 B2 | 3/2016 | Yazawa |
| 2005/0270379 A1* | 12/2005 | Seo ........................ G03B 17/02 |
| | | 348/208.5 |
| 2007/0279497 A1* | 12/2007 | Wada ....................... G03B 5/00 |
| | | 348/208.7 |
| 2008/0145041 A1* | 6/2008 | Enomoto ................. G03B 5/00 |
| | | 396/53 |
| 2012/0268642 A1 | 10/2012 | Kawai |
| 2013/0194442 A1 | 8/2013 | Yazawa |
| 2014/0362284 A1* | 12/2014 | Shin ..................... G02B 27/646 |
| | | 348/373 |
| 2015/0103195 A1* | 4/2015 | Kwon .................. H04N 5/2253 |
| | | 348/208.12 |
| 2016/0072998 A1 | 3/2016 | Yazawa |

FOREIGN PATENT DOCUMENTS

| | | |
|---|---|---|
| JP | 08-265612 A | 10/1996 |
| JP | 2008-035308 A | 2/2008 |
| JP | 2012-226205 A | 11/2012 |
| JP | 2013-160806 A | 8/2013 |

\* cited by examiner

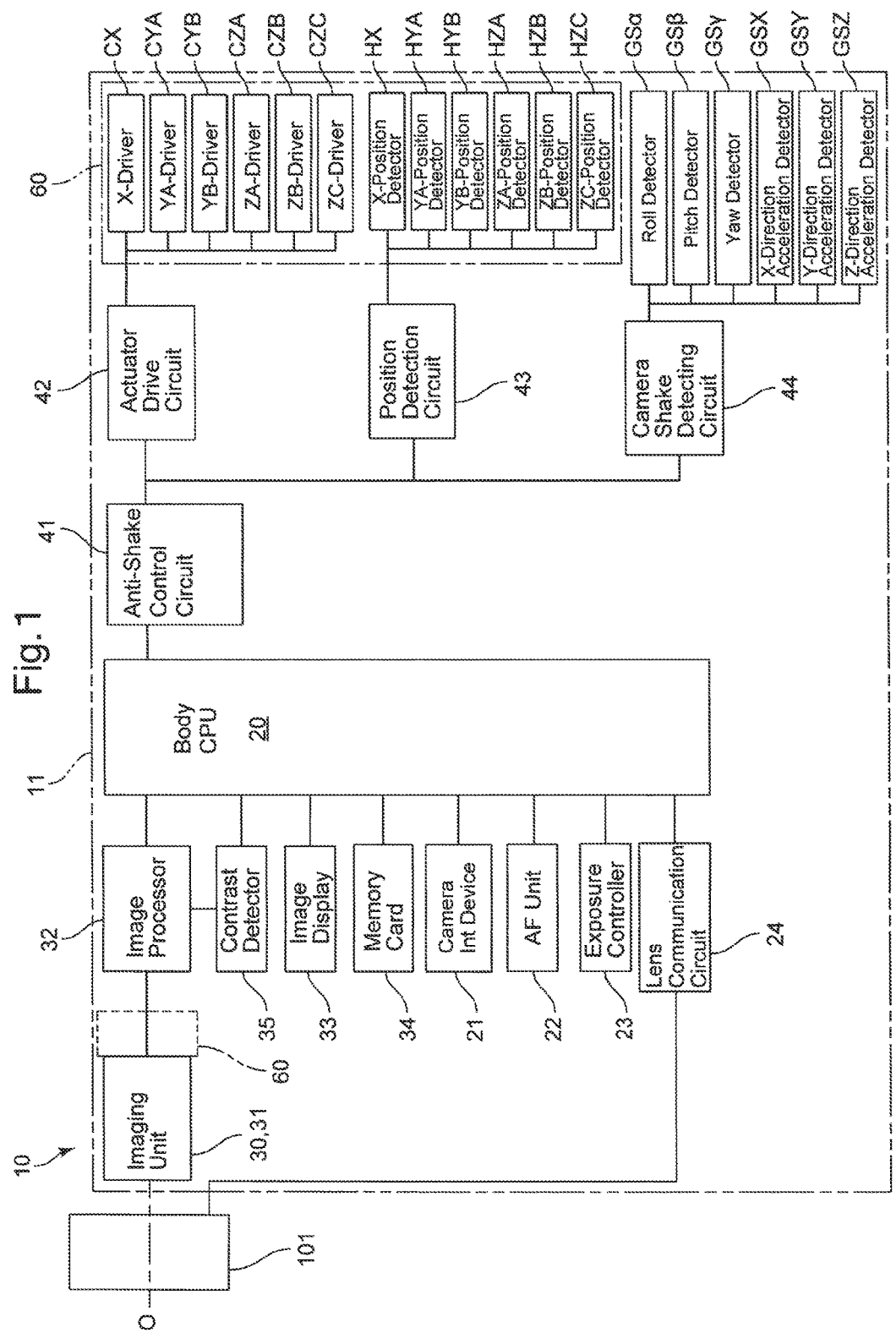

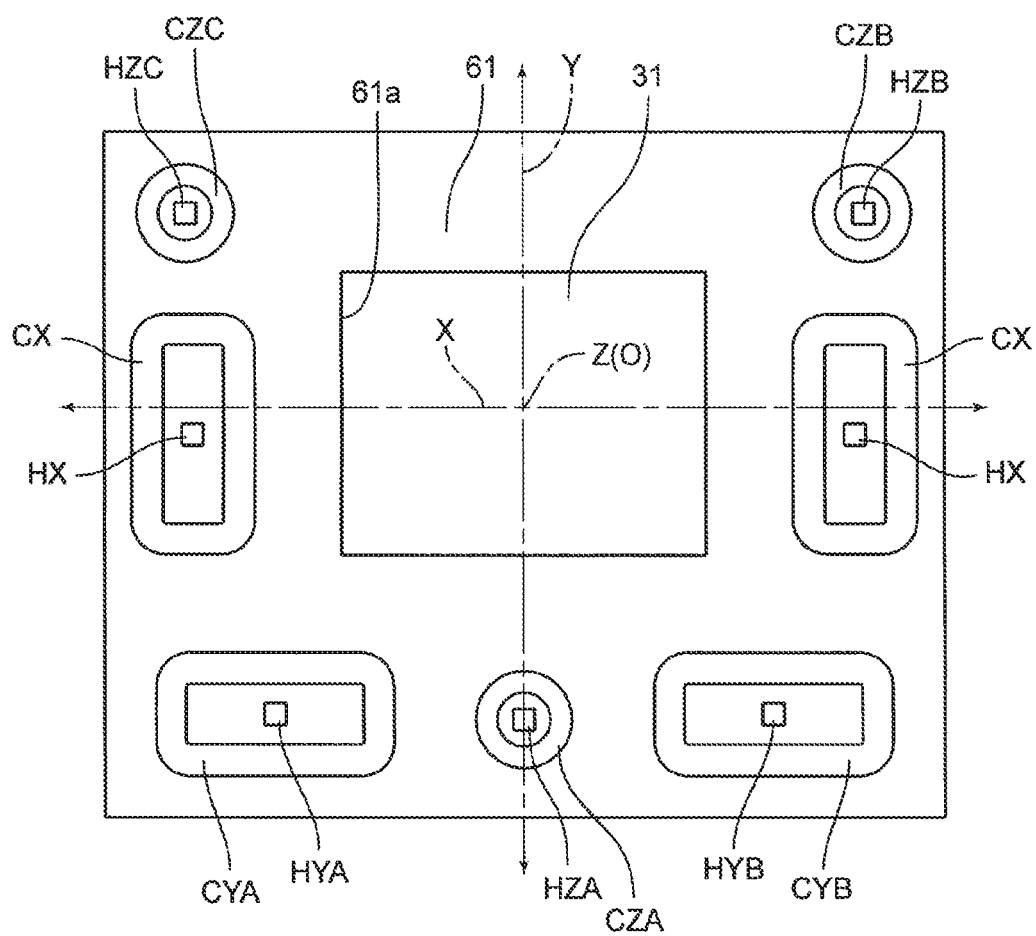

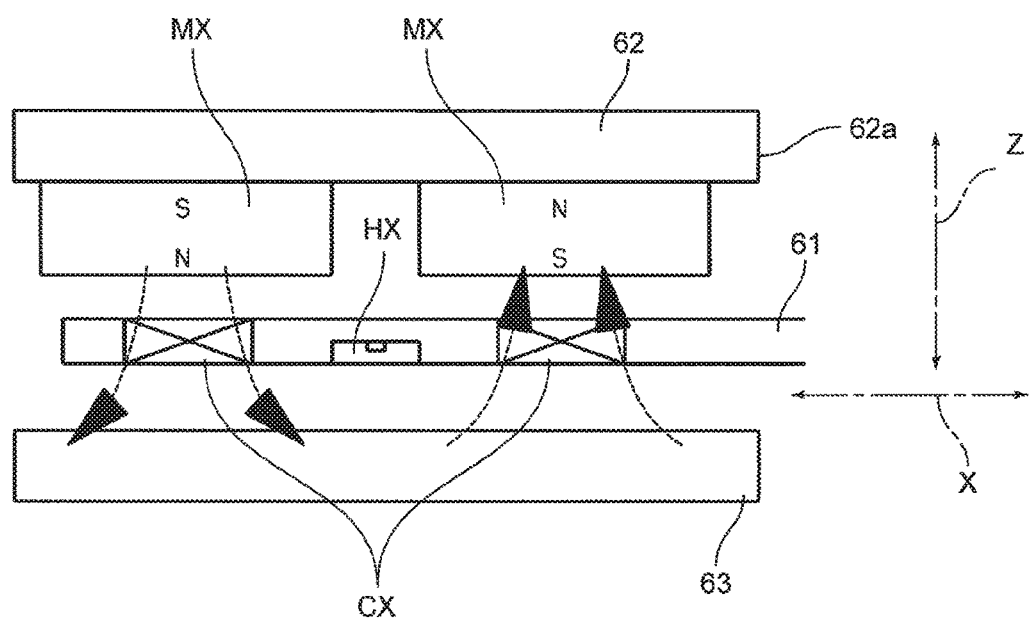

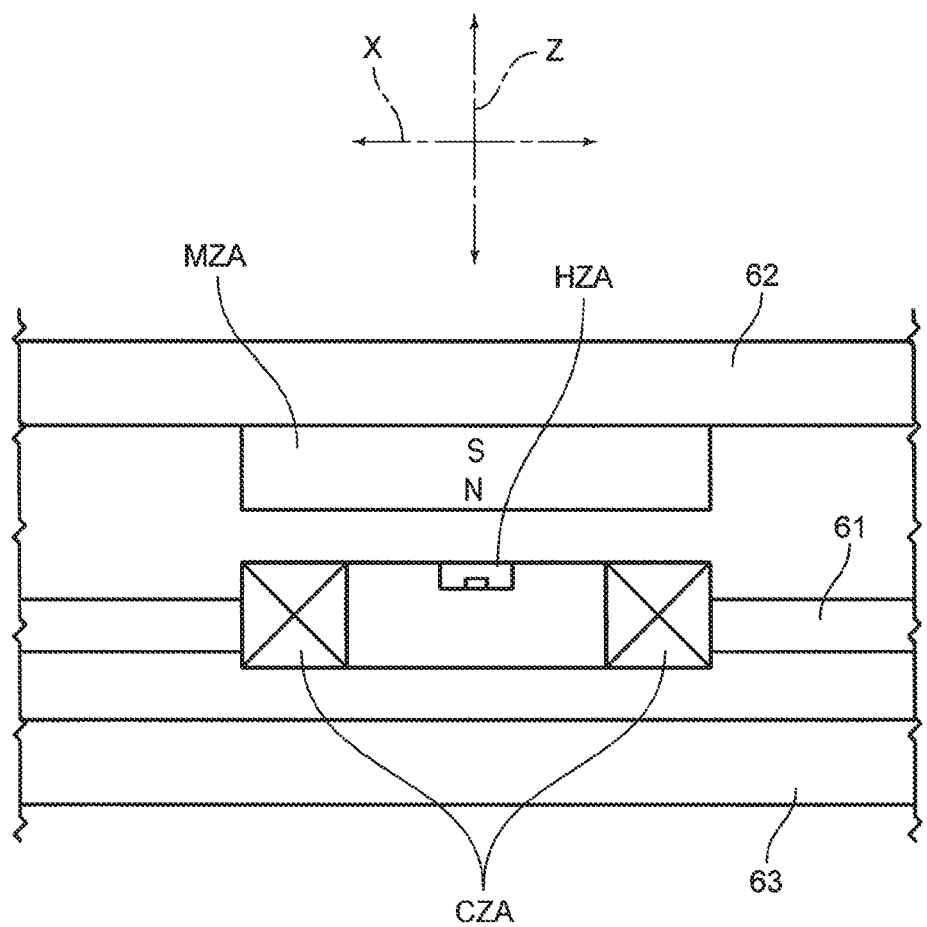

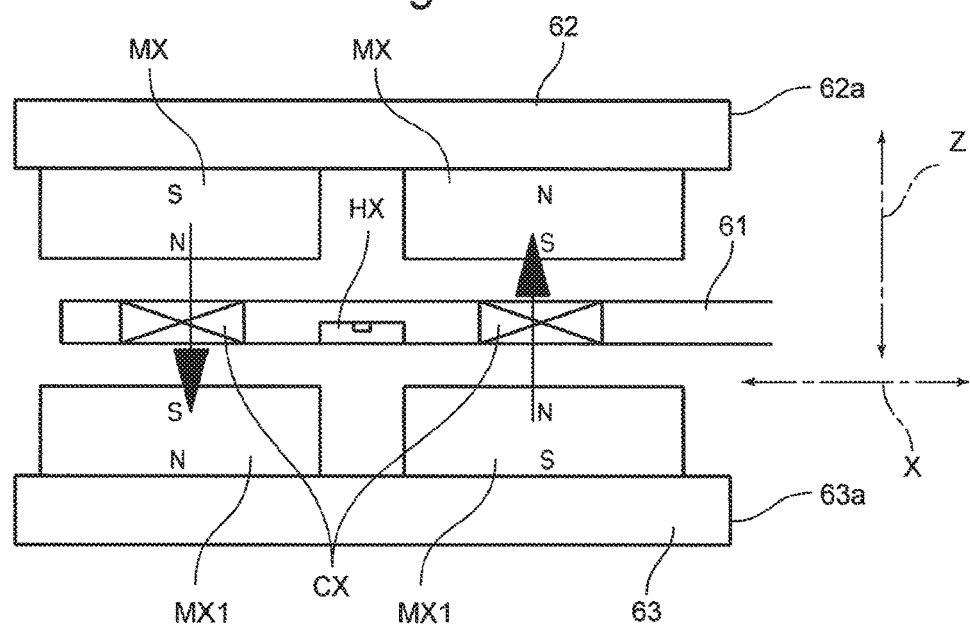
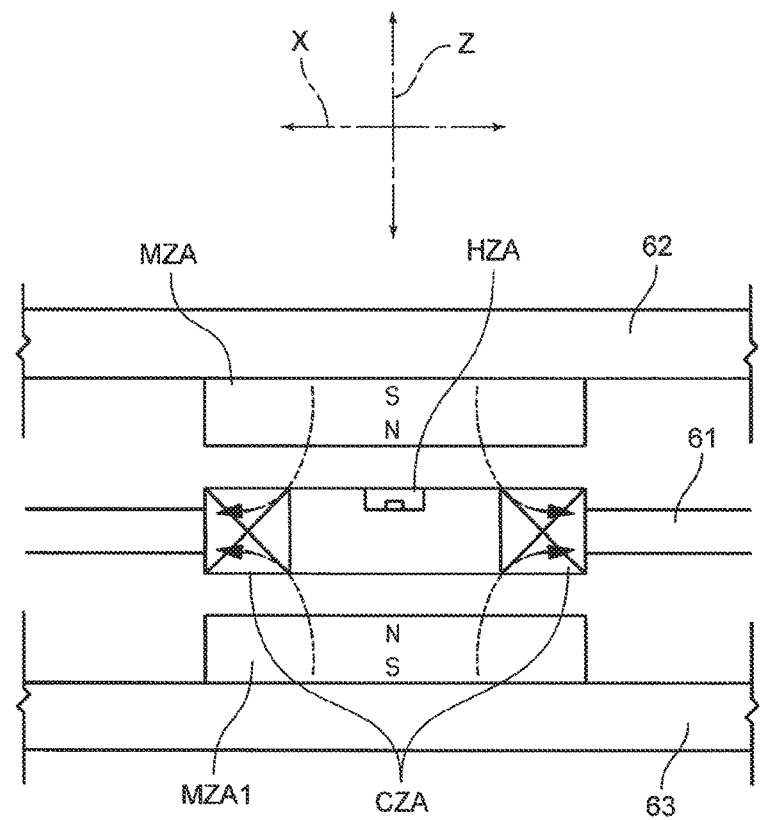

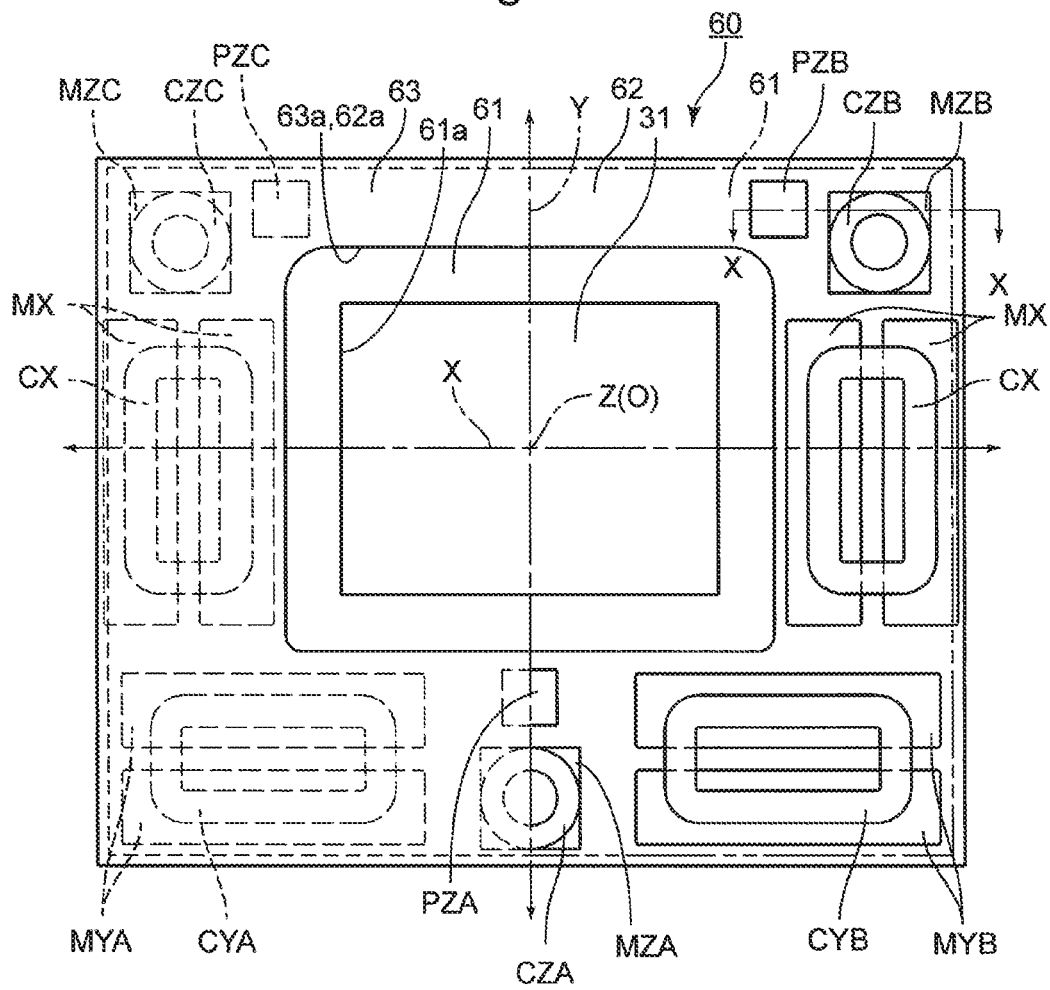

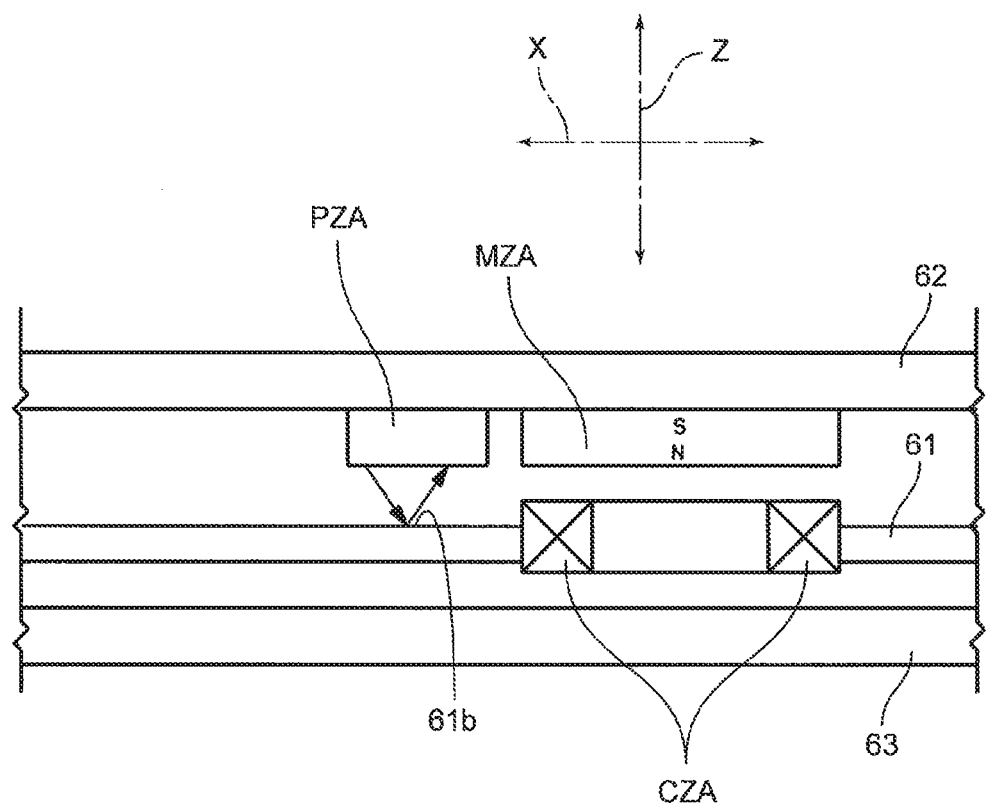

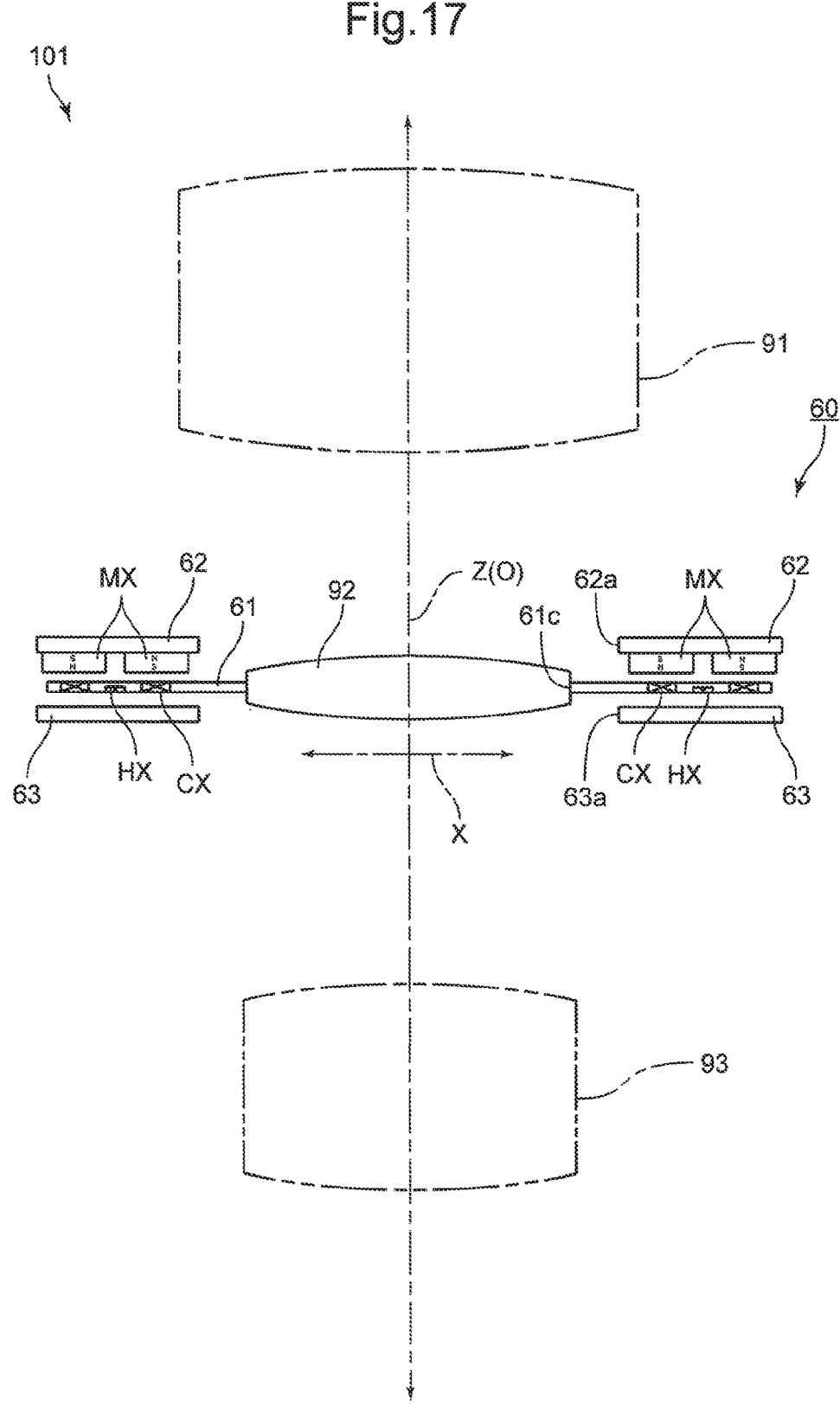

IMAGING APPARATUS, IMAGE PROJECTOR APPARATUS, AND STAGE APPARATUS

BACKGROUND OF THE INVENTION

1. Field of the Invention

The present invention relates to an imaging apparatus, an image projector apparatus, and a stage apparatus which can control motion with six degrees of freedom (6 DoF).

2. Description of the Related Art

A shake reduction (image shake correction/image stabilizing/anti-shake) system designed as an in-body shake reduction system which drives an image sensor in a camera body of an SLR camera system to perform an image shake correction operation is known in the art, wherein the image sensor is driven in the X-direction (the X-axis direction) and the Y-direction (the Y-axis direction), which are orthogonal to an optical axis, using oblong-shaped planar coils and permanent magnets and the image sensor is also driven in the Z-direction (the Z-axis direction), which coincides with the optical axis direction, by a piezoelectric actuator. This type of shake reduction system is disclosed in Patent Literature 1. In Patent Literature 2, an imaging apparatus in which an image sensor is moved in an optical axis direction to perform a focus adjustment is disclosed. In Patent Literature 3, an imaging apparatus equipped with a vibration reduction system is disclosed, in which the vibration reduction system supports an image sensor in a manner to allow the image sensor to be freely movable in the X-direction, the Y-direction and the Z-direction via coil springs provided in an extended state in the X-direction, the Y-direction and the Z-direction and in which the vibration reduction system drives the image sensor so that it rotates (tilts) about the X-direction (the X-axis), the Y-direction (the Y-axis) and the Z-direction (the Z-axis). In Patent Literature 4, an imaging apparatus which makes a tilt photography possible by rotating an image sensor about the X-direction and the Y-direction is disclosed.

Additionally, cameras equipped with a 5-axis image stabilizing system which rotates (tilts) an image sensor about the X-direction, rotates (tilts) the image sensor about the Y-direction, moves the image sensor in the X-direction, moves the image sensor in the Y-direction and rotates (tilts) the image sensor about the Z-direction (about an optical axis) have been known in recent years.

[Patent Literature 1] Japanese Unexamined Patent Publication No. 2012-226205

[Patent Literature 2] Japanese Unexamined Patent Publication No. S59-11071

[Patent Literature 3] Japanese Unexamined Patent Publication No. H08-265612

[Patent Literature 4] Japanese Unexamined Patent Publication No. 2008-35308

However, in these related-art imaging apparatuses, the movable stage that supports an image sensor is in contact with some sort of support base (e.g., a base member), and therefore, the occurrence of sliding (moving) resistance cannot be avoided when the image sensor is driven. In addition, due to the occurrence of such sliding resistance, it is a fact that there is a limit to the degree of freedom in movement of the image sensor with the above-described imaging apparatuses of the related art.

SUMMARY OF THE INVENTION

The present invention has been devised in view of the above described issues, and the present invention provides an imaging apparatus and a stage apparatus in which no sliding resistance occurs when a movable member such as a movable stage is driven and which makes it possible to increase the degree of freedom in movement of the movable member.

According to an aspect of the present invention, an imaging apparatus is provided, including a photographing optical system; an image sensor onto which an object image is projected through the photographing optical system; a movable member to which the image sensor is fixed; a base member which holds the movable member in a manner to allow the movable member to move relative to the base member; and a thrust generator which generates thrust forces in different directions against the movable member. The different directions include a first direction, a second direction and a third direction, the first direction being parallel with a direction of an optical axis of the photographing optical system. An interaction of the thrust forces against the movable member in at least one of the different directions causes the movable member to at least one of: translate relative to the base member in the first direction, translate relative to the base member in the second direction, translate relative to the base member in the third direction, rotate relative to the base member about the first direction, rotate relative to the base member about the second direction, and rotate relative to the base member about the third direction.

It is desirable for the second direction and the third direction to be orthogonal to each other and orthogonal to the first direction. The thrust generator includes a first thrust generator which generates the thrust force in the first direction; a second thrust generator which generates the thrust force in the second direction; and a third thrust generator which generates the thrust force in the third direction. At least one of the second thrust generator and the third thrust generator includes a pair of thrust generators which are spaced from each other in one of the second direction and the third direction. A pair of trust forces generated by the pair of thrust generators causes the movable member to at least one of: translate in the second direction, translate in the third direction, and rotate about the first direction.

It is desirable for the other of the second thrust generator and the third thrust generator to include a second pair of thrust generators which are positioned symmetrically with respect to the optical axis. An interaction of the thrust forces in one of the second direction and the third direction, which are generated by the second pair of thrust generators, causes the movable member to translate in the one of the second direction and the third direction.

It is desirable for the other of the second thrust generator and the third thrust generator to include a second pair of thrust generators which are spaced from each other in one of the second direction and the third direction. An interaction of the thrust forces in one of the second direction and the third direction, which are generated by the second pair of thrust generators, causes the movable member to translate in the one of the second direction and the third direction.

It is desirable for the first thrust generator to include a plurality of thrust generators which are arranged at different positions about the optical axis. An interaction of thrust forces in the first direction, which are generated by the plurality of thrust generators of the first thrust generator, causes the movable member to at least one of translate in the first direction, rotate about the second direction, and rotate about the third direction.

It is desirable for the first thrust generator to include a plurality of thrust generators, at least one of which is positioned between the pair of thrust generators of the one of the second thrust generator and the third thrust generator.

It is desirable for the center of gravity of the first thrust generator to be coincident with the center of gravity of the movable member.

It is desirable for the thrust generator to include a drive coil fixed to one of the base member and the movable member; and a permanent magnet fixed to the other of the base member and the movable member.

It is desirable for the base member to include a front fixed yoke and a rear fixed yoke which face the movable member from front and rear thereof along the first direction, and for the thrust generator to include a drive coil which is fixed to the movable member; and a permanent magnet which is fixed to at least one of the front fixed yoke and the rear fixed yoke.

Alternatively, it is desirable for the base member to include a front fixed yoke and a rear fixed yoke which face the movable member from front and rear thereof along the first direction, and for the thrust generator to include a drive coil which is fixed to at least one of the front fixed yoke and the rear fixed yoke; and a permanent magnet which is fixed to the movable member.

It is desirable for the thrust generator to hold the movable member in a levitation state with respect to the front fixed yoke and the rear fixed yoke by interaction of the thrust forces in the different directions.

It is desirable for each of the second thrust generator and the third thrust generator to include permanent magnets which are fixed to the front fixed yoke and the rear fixed yoke. The permanent magnets, which are fixed to the front fixed yoke and the rear fixed yoke, are positioned so that opposite magnetic poles thereof are placed face-to-face.

It is desirable for the first thrust generator to include permanent magnets which are fixed to the front fixed yoke and the rear fixed yoke; and a drive coil which is fixed to the movable member. The permanent magnets, which are fixed to the front fixed yoke and the rear fixed yoke, are positioned so that same magnetic poles thereof are placed face-to-face.

It is desirable for the first thrust generator to include piezoelectric elements which are provided at different positions between the movable member and the image sensor, the piezoelectric elements configured to contract and expand in the first direction to thereby move the image sensor toward and away from the movable member.

It is desirable for the imaging apparatus to further include position detectors which detect a position of the movable member relative to the base member at different positions on the movable member; and a processor which calculates translation positions of the movable member relative to the base member in the first direction, the second direction and the third direction and rotational positions of the movable member relative to the base member about the first direction, the second direction and the third direction.

In an embodiment, a stage apparatus is provided, including a base member; a movable member configured to move relative to the base member; and a thrust generator which generates thrust forces in different directions against the movable member. An interaction of the thrust forces against the movable member in at least one of the different direction causes the movable member to at least one of: translate relative to the base member, rotate relative to the base member, translate while rotating relative to the base member, and rotate while translating relative to the base member.

It is desirable for the different directions to include a first direction, a second direction and a third direction, the first direction being parallel with a direction of an optical axis of the photographing optical system. An interaction of the thrust forces against the movable member causes the movable member to at least one of: translate relative to the base member in the first direction, translate relative to the base member in the second direction, translate relative to the base member in the third direction, rotate relative to the base member about the first direction, rotate relative to the base member about the second direction, and rotate relative to the base member about the third direction.

It is desirable for the movable member to be held in a noncontact state with the base member by interaction of the thrust forces in the different directions.

It is desirable for the stage apparatus to further include position detectors which detect a position of the movable member relative to the base member at different positions on the movable member; and a processor which calculates positions of the movable member relative to the base member in the first direction, the second direction and the third direction and rotational positions of the movable member relative to the base member about the first direction, the second direction and the third direction.

In an embodiment, a stage apparatus is provided, including a base member; a movable member configured to move relative to the base member; and a thrust controller which controls a thrust force in different directions against the movable member. An interaction of the trust forces, which are control by the trust controller, causes the movable member to at least one of: translate relative to the base member, rotate relative to the base member, translate while rotating relative to the base member, and rotate while translating relative to the base member.

The imaging apparatus according to the present invention can translate and rotate (tilt or turn) the image sensor in and about three mutually-different directions: the first direction (which is parallel to an optical axis of the imaging optical system), the second direction and the third direction, thus making it possible to perform an image shake correction operation in all six directions with six degrees of freedom (6 DoF) and also to make special photographic effects possible.

The stage apparatus according to the present invention can move the movable member in all six directions, i.e., move (translate) the movable member in the X-direction, the Y-direction and the Z-direction, tilt (rotate) the movable member about the X-direction and the Y-direction, and turn (rotate) the movable member about the Z-direction, thereby exhibiting six degrees of freedom.

The image projector apparatus of the present invention can move an image-forming element in all six directions with six degrees of freedom, thereby facilitating various adjustments such as the adjustment of the projecting direction.

Furthermore, the stage apparatus of the present invention can translate and rotate the movable member, translate while rotating the movable member, translate the movable member after rotating the same, and rotate while translating the movable member, thus being effective at being used in not only an imaging apparatus or an image projector apparatus of a camera but also various other optical apparatuses.

The present disclosure relates to subject matter contained in Japanese Patent Application No. 2015-232908 (filed on Nov. 30, 2015) and Japanese Patent Application No. 2016-226905 (filed on Nov. 22, 2016) which are expressly incorporated herein by reference in their entireties.

BRIEF DESCRIPTION OF THE DRAWINGS

The present invention will be described below in detail with reference to the accompanying drawings in which:

FIG. 1 is a block diagram illustrating main components of a digital camera which incorporates an imaging apparatus equipped with a stage apparatus according to the present invention;

FIG. 3 is a rear elevational view of the movable stage and associated elements in the first embodiment of the stage apparatus;

FIG. 4 is an enlarged sectional view of one of a pair of X-direction drivers (specifically the left X-direction driver) shown in FIG. 2B;

FIG. 5 is an enlarged sectional view taken along the section line V-V shown in FIG. 2A;

FIG. 7 is an enlarged sectional view of one of a pair of X-direction drivers (specifically the left X-direction driver) shown in FIG. 6B;

FIG. 8 is an enlarged sectional view taken along the section line VIII-VIII shown in FIG. 6A;

FIG. 9 is a front elevational view of a third embodiment of the stage apparatus, FIG. 10 is an enlarged sectional view taken along the section line X-X shown in FIG. 9;

FIG. 17 is a sectional view, corresponding to the sectional view of FIG. 2B, of an embodiment of a hand-shake correction device (image stabilizer), according to the present invention.

DESCRIPTION OF THE PREFERRED EMBODIMENTS

Figure 2A:
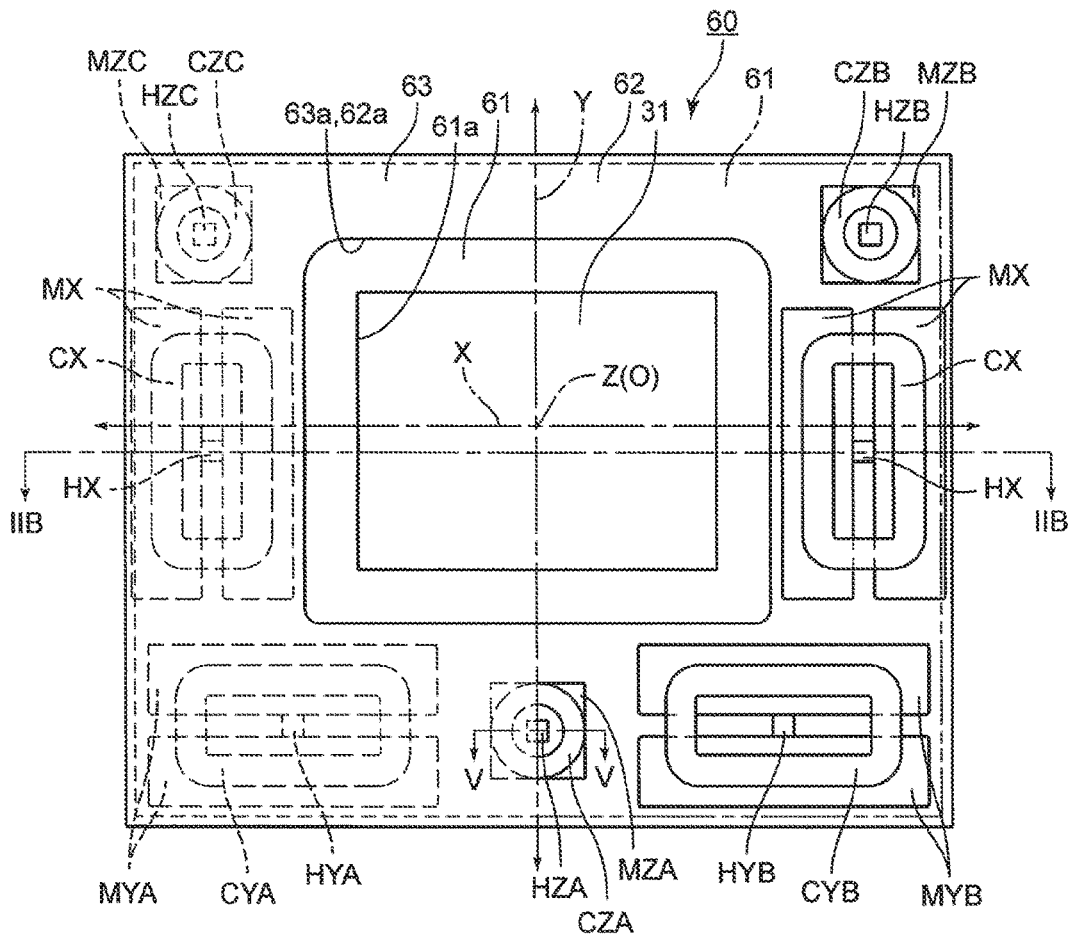
FIG. 2A is a rear elevational view of a first embodiment of the stage apparatus with six degrees of freedom according to the present invention, wherein a rear yoke and a movable stage are not shown in a right half of FIG. 2A.
Figure 2B:
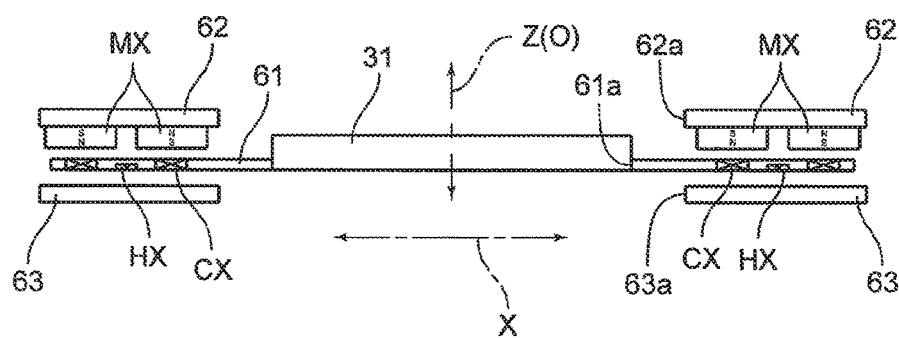
FIG. 2B is a sectional view taken along the section line IIB-IIB shown in FIG. 2A.
Figure 6A:
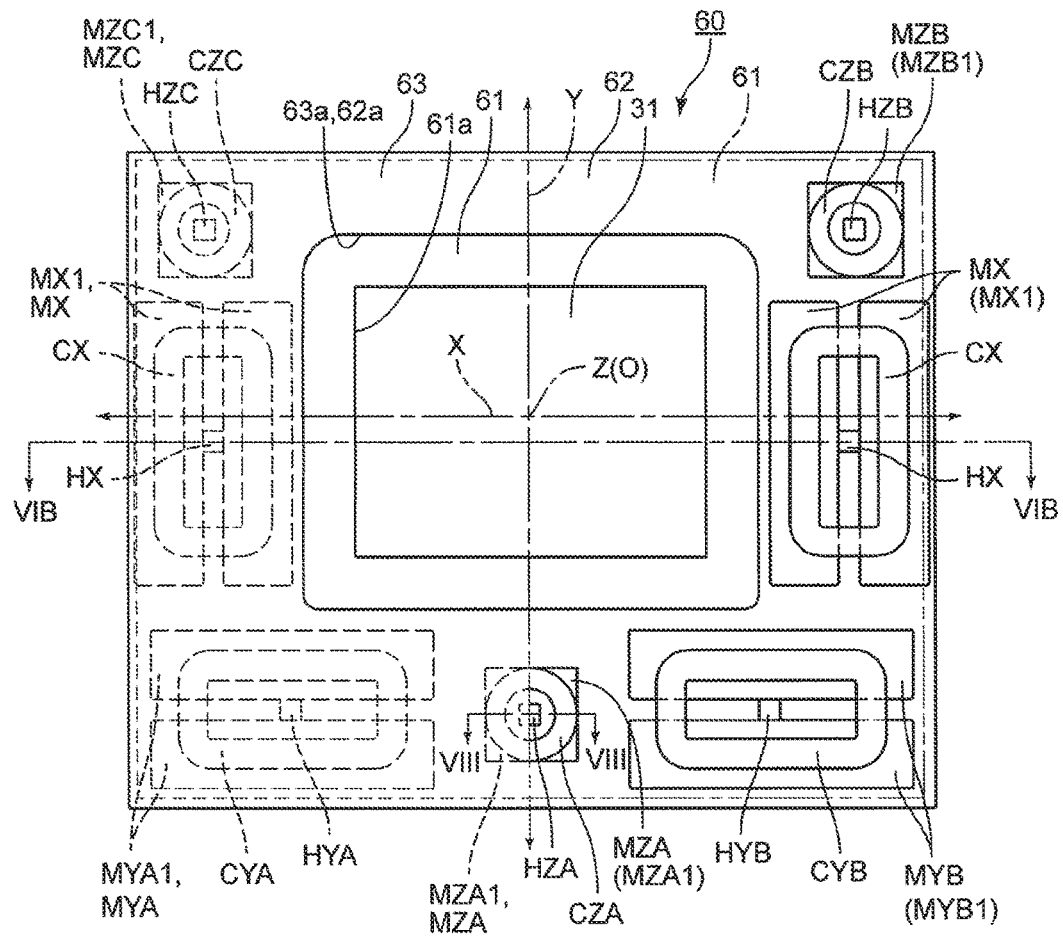
FIG. 6A is a rear elevational view of a second embodiment of the stage apparatus, wherein a rear yoke and a movable stage not shown in a right half of FIG. 6A.
Figure 6B:
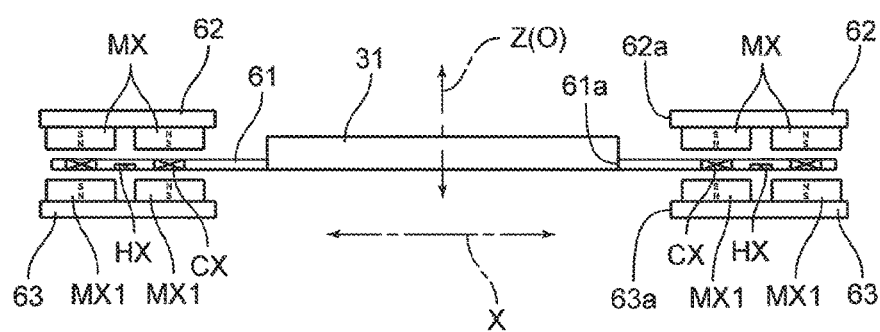
FIG. 6B is a sectional view taken along the section line VIB-VIB shown in FIG. 6A.
Figure 11A:
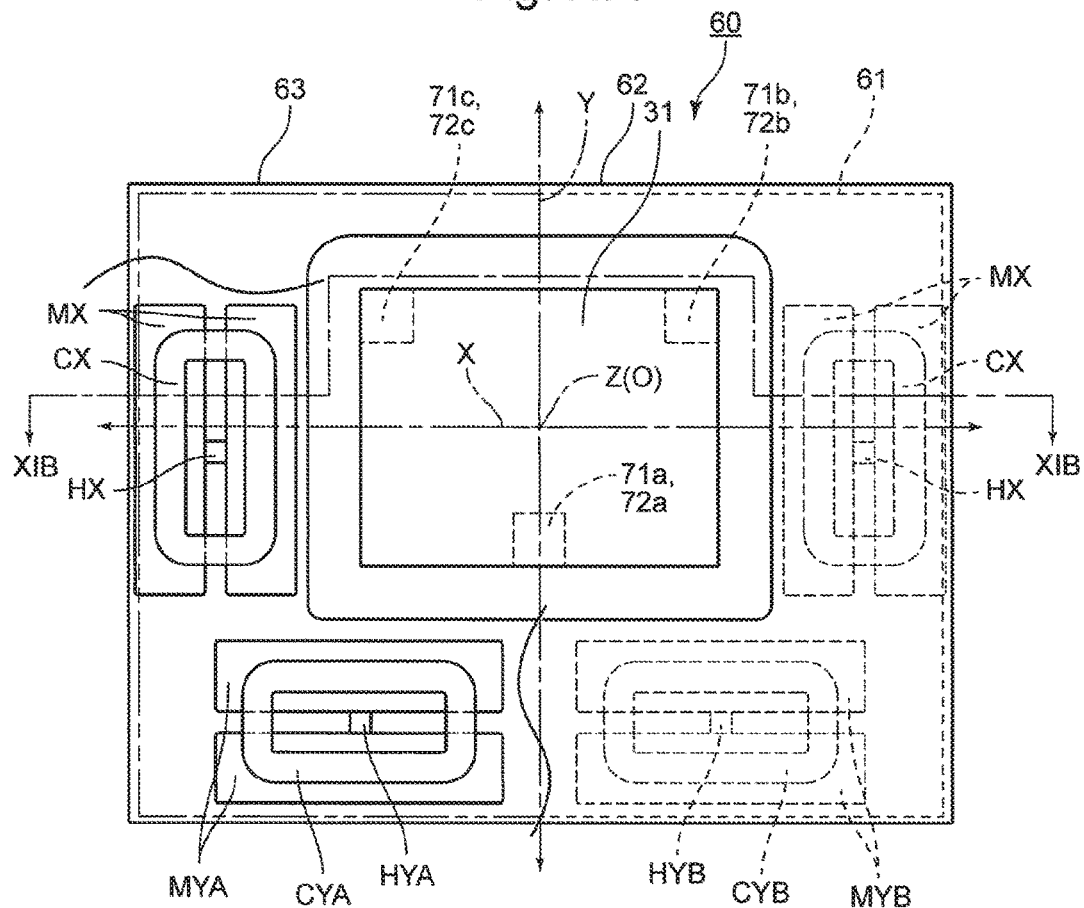
FIG. 11A is a rear elevational view of a fourth embodiment of the stage apparatus, wherein the rear yoke and the movable stage are not shown in a right half of FIG. 11A.
Figure 11B:
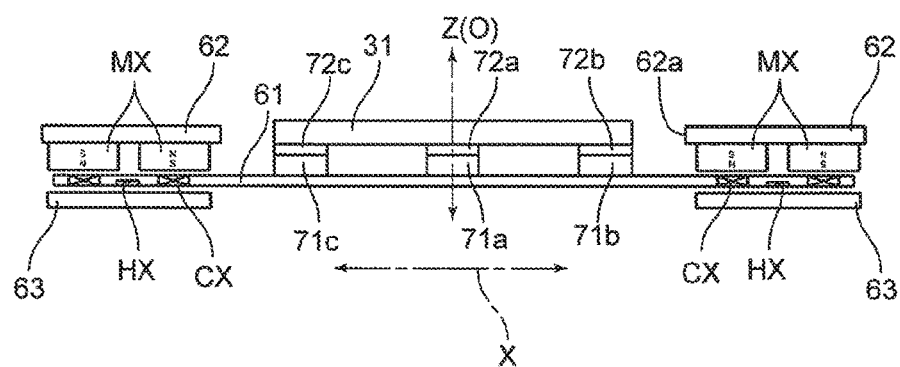
FIG. 11B is a sectional view taken along the section line XIB-XIB shown in FIG. 11A.

Embodiments of the present invention will be hereinafter discussed with reference to FIGS. 1 through 15. FIG. 1 is a conceptual block diagram of main components and main circuit elements of a digital camera which incorporates an imaging apparatus equipped with a stage apparatus according to the present invention. In the diagram of FIG. 1, the direction parallel to a photographing optical axis O (which includes the concept of a direction aligned with the photographing optical axis O) is defined as the first direction (Z-direction/Z-axis direction), a direction orthogonal to the first direction is defined as the second direction (X-direction/X-axis direction), and a direction orthogonal to both the first direction (Z-direction) and the second direction (X-direction) is defined as the third direction (Y-direction/Y-axis direction). When the photographing optical axis O is defined as the Z-axis, two axes orthogonal to the Z-axis are regarded as the X-axis and the Y-axis. When the camera is in a normal position (horizontal position), the first direction (Z-direction/Z-axis) and the second direction (X-direction/X-axis) are defined as horizontal directions and the third direction (Y-direction/Y-axis) is defined as a vertical direction, and the object side and the direction toward the object defines a front side (of the imaging apparatus) and a forward direction, respectively. Furthermore, in the present disclosure, rotation about the Z-direction (first direction) refers to rotation about an imaginary axis that is parallel to the Z-axis. Similarly, rotation about the X-direction (second direction) refers to rotation about an imaginary axis that is parallel to the X-axis, and rotation about the Y-direction (third direction) refers to rotation about an imaginary axis that is parallel to the y-axis.

The digital camera 10 is provided with a camera body 11 and a photographic lens 101 as a photographing optical system. The digital camera 10 is provided in the camera body 11 with a body CPU 20 and an imaging unit 30. The body CPU 20 controls the overall operations of the camera, performs computational and arithmetic operations, and controls driving of the camera 10. The imaging unit 30 is provided with an image sensor (image pickup device) 31, onto which an object image is projected (made incident) via the photographic lens 101. The body CPU 20 controls the driving of the image sensor 31, processes image signals of captured object images at an image processor 32 to display the captured object images on an image display (monitor) 33, and writes data of the captured object images onto a memory card 34.

The digital camera 10 is provided with a contrast detector 35, a camera input device 21, an AF Unit 22, an exposure controller 23 and a lens communication circuit 24. The contrast detector 35 detects the contrast of an object image from the image signal processed by the image processor 32. The camera input device 21 includes, e.g., control switches, buttons, a dial (s) and/or a touchscreen, which are manually operated by the user to operate all the functions of the camera. The AF Unit 22 drives a focusing optical system (not shown), contained in the photographic lens 101, in the optical axis direction (the direction along the optical axis O) to adjust the focus. The exposure controller 23 controls opening and closing operations of a diaphragm, a shutter, etc., to adjust the quantity of light incident on the image sensor 31 and drives the image sensor 31 to control imaging operations. The lens communication circuit 24 performs communications with the photographic lens 101 to input information on the focal length, etc., of the photographic lens 101.

The digital camera 10 is provided with a roll detector GSα (which detects turning (rotation) about the Z-direction), a pitch detector GSβ (which detects tilt (rotation) about the X-direction), a yaw detector GSγ (which detects tilt (rotation) about the Y-direction), an X-direction acceleration detector GSX, a Y-direction acceleration detector GSY and a Z-direction acceleration detector GSZ as detectors for detecting shaking (vibrations) of the camera body 11 that is caused by hand shake; each of these six detectors are connected to a camera shake detecting circuit 44. These six detectors can be provided as a combined sensor, e.g., a six-axis sensor, a triple-axis gyro sensor, or a triple-axis acceleration sensor.

The imaging unit 30 is provided with a stage apparatus 60. The stage apparatus 60 is provided with a movable stage 61, a front fixed yoke 62 and a rear fixed yoke 63. The image sensor 31 is fixedly mounted to the movable stage 61, and the front fixed yoke 62 and the rear fixed yoke 63 are positioned in front of and behind the movable stage 61, respectively. The stage apparatus 60 levitationally supports the movable stage 61 (so that the movable stage 61 is magnetically levitated) relative to the front fixed yoke 62 and the rear fixed yoke 63 at least when energized. The image sensor 31 constitutes a low-profile driven member having a flat front surface. In a levitational state, the movable stage 61 of the stage apparatus 60 can translate (linearly move) in the Z-direction (the first direction), translate in the X-direction (second direction) which is orthogonal to the Z-direction, translate in the Y-direction (third direction) which is orthogonal to both the X-direction and the Z-direction, tilt (rotate) about the X-direction (second direction), tilt (rotate) about the Y-direction (third direction), and turn (rotate) about the Z-direction (first direction) to thereby exhibit six axes of motion/motion with six degrees of freedom (6 DoF) (see FIGS. 2 through 5). Accordingly, the movable stage 61 of the stage apparatus 60 can translate, rotate, translate while rotating, translate after rotating, rotate after translating, and/or perform a combination of such translating and rotating operations. In the present disclosure, the term "translate" refers to moving along at least one of the X-direction, Y-direction and Z-direction without changing either the orientation or angular displacement of the image plane, corresponding to the light-receiving surface of the image sensor 31 provided on the movable stage, relative to the camera body 11, the term "tilt" refers to rotating about at least one of the X-direction and Y-direction to change the orientation of the image plane relative to the camera body 11, and the term "turn" refers to rotating about the Z-direction so that the image plane rotates about the optical axis O. In addition, the term "levitation" includes the concept of holding the movable stage 61 between the front fixed yoke 62 and the rear fixed yoke 63 in a noncontact state with the front fixed yoke 62 and the rear fixed yoke 63 so that the movable stage 61 is held against the force of gravity in a levitated state (levitated and stationary state), and the concept of holding the movable stage 61 between the front fixed yoke 62 and the rear fixed yoke 63 in a noncontact state with the front fixed yoke 62 and the rear fixed yoke 63 at a center position (imaging initial position) where the center of the image sensor 31 is coincident with the optical axis O (the Z-axis).

The body CPU 20 inputs information on the focal length f from the photographic lens 101 via, e.g., the lens communication circuit 24, calculates the vibration direction, the vibration speed, etc., of the digital camera 10 based on detection signals input from the pitch (tilt (rotation) about the X-direction) detector GSβ, the yaw (tilt (rotation) about the Y-direction) detector GSγ, the roll (turn (rotation) about the Z-direction) detector GSα, the X-direction acceleration detector GSX, the Y-direction acceleration detector GSY and the Z-direction acceleration detector GSZ, calculates the driving direction, the driving speed and the driving amount of the image sensor 31 so that the object image projected onto the image sensor 31 via the photographic lens 101 does not move relative to the image sensor 31 and drives the movable stage 61 of the stage apparatus 60 in with six degrees of freedom (6 DoF) (six-axis motion), i.e., move (translate) the movable member in the X-direction, the Y-direction and/or the Z-direction, tilt (rotate) the movable member about the X-direction and/or the Y-axis, and/or turn (rotate) the movable member about the Z-direction, based on the calculation results. For example, the movable stage 61 can translate, rotate (tilt or turn), translate while rotating, translate after rotating, and rotating after translation. The order of these movements is optional.

The stage apparatus 60 functions as a supporter (a supporting means) which supports the movable stage 61, to which the image sensor 31 is fixed, in a manner to allow the movable stage 61 to translate and rotate (tilt or turn) with six degrees of freedom (6 DoF) with respect to the front fixed yoke 62 and the rear fixed yoke 63. The movable stage 61 is a rectangular plate (frame) and greater in size than the image sensor 31 as viewed from the front. The front fixed yoke 62 and the rear fixed yoke 63 are rectangular plates (frames) of the same size and have slightly greater outer dimensions than those of the movable stage 61 in a plan view. The front fixed yoke 62 and the rear fixed yoke 63 are provided at the centers thereof with rectangular openings 62a and 63a, respectively, which have greater dimensions than the outer dimensions of the image sensor 31 as viewed from front (as viewed in the Z-direction). The front fixed yoke 62 and the rear fixed yoke 63 are connected and held in parallel with each other with a predetermined distance therebetween via a plurality of connecting columns (not shown) at positions not interfering with the movable stage 61 even when the movable stage 61 is moved (translated, tilted or turned) within a predetermined range.

The stage apparatus 60 is provided with a left pair of X-direction magnets (left and right X-direction magnets) MX and a right pair of X-direction magnets (left and right X-direction magnets) MX, each pair being made of two permanent magnets identical in specification. The left pair of X-direction magnets MX and the right pair of X-direction magnets MX are fixed to the rear of the front fixed yoke 62 to be positioned on either side of the opening 62a with respect to the leftward and rightward directions (on either side of the Z-axis with the Y-axis as a center line). Although the stage apparatus 60 is provided with the two pairs of X-direction magnets MX on either side of the opening 62a in the X-direction in the present embodiment of the stage apparatus, it is possible for the two pairs of X-direction magnets MX to be provided only on one side of the opening 62a with respect to the X-direction. Each X-direction magnet MX is a plate-like magnet which is elongated in the Y-direction and thin in the Z-direction, and the left and right X-direction magnets MX of each pair are arranged parallel to the Y-axis and spaced from each other in the X-direction. In each pair of X-direction magnets MX, the front and the rear sides of one X-direction magnet MX (the left X-direction magnet MX with respect to FIG. 2B) are the south pole and the north pole, respectively, while the front and the rear sides of the other X-direction magnet MX (the right X-direction magnet MX with respect to FIG. 2B) are the north pole and the south pole, respectively. With the passage of magnetic flux of the left and right X-direction magnets MX of each pair through the front fixed yoke 62 and the rear fixed yoke 63, a portion of a magnetic circuit (thrust generator/thrust controller) which generates thrust in the X-direction (the second direction) is formed between the left and right X-direction magnets MX of each pair and the facing portions of the rear fixed yoke 63 which face the left and right X-direction magnets MX of the same pair (see FIG. 4). The left and right pairs of X-direction magnets MX also act (function) as a levitator which levitates and holds the movable stage 61 at a center position (initial position) regardless of the attitude of the camera body 11, e.g., when the camera is held to one side in a vertical position in which the grip of the camera body 11 faces up or down, or at an inclined angle other than a horizontal position.

The stage apparatus 60 is provided with a left pair of Y-direction magnets (upper and lower Y-direction magnets) MYA and a right pair of Y-direction magnets (upper and lower Y-direction magnets) MYB, each pair being made of two permanent magnets identical in specification. The left pair of Y-direction magnets MYA and the right pair of Y-direction magnets MYB are fixed to the rear of the front fixed yoke 62 to be positioned below the opening 62a (to be spaced downward from the Z-axis with the Y-axis as a center line). Each Y-direction magnet MYA and MYB is a plate-like magnet which is elongated in the X-direction and thin in the Z-direction. The upper and lower Y-direction magnets MYA are arranged parallel to the X-axis and spaced from each other in the Y-direction, and the upper and lower Y-direction magnets MYB are arranged parallel to the X-axis and spaced from each other in the Y-direction. In each pair of Y-direction magnets MYA and MYB, the front and the rear sides of one Y-direction magnet MYA or MYB (the upper Y-direction magnet MYA or MYB with respect to FIG. 2A) are the south pole and the north pole, respectively, while the front and the rear sides of the other Y-direction magnet MYA or MYB (the lower Y-direction magnet MYA or MYB with respect to FIG. 2A) are the north pole and the south pole, respectively. With the passage of magnetic flux of the left pair of Y-direction magnets MYA through the front fixed yoke 62 and the rear fixed yoke 63, a portion of a magnetic circuit (thrust generator/thrust controller) which generates thrust in the Y-direction (the third direction) is formed between the left pair of Y-direction magnets MYA and the facing portions of the rear fixed yoke 63 which face the left pair of Y-direction magnets MYA. Likewise, with the passage of magnetic flux of the right pair of Y-direction magnets MYB through the front fixed yoke 62 and the rear fixed yoke 63, a portion of a magnetic circuit (thrust generator/thrust controller) which generates thrust in the Y-direction (the third direction) is formed between the right pair of Y-direction magnets MYB and the facing portions of the rear fixed yoke 63 which face the right pair of Y-direction magnets MYB. The left and right pairs of Y-direction magnets MYA and MYB also act (function) as a levitator which levitates and holds the movable stage 61 at a center position (initial position) regardless of the attitude of the camera body 11, and especially when the camera is held in a normal position (horizontal position).

The stage apparatus 60 is further provided with three Z-direction magnets MZA, MZB and MZC, respectively (see FIGS. 2A, 3 and 5), at three positions different from the positions of the left pair of X-direction magnets MX, the right pair of X-direction magnets MX, the left pair of Y-direction magnets MYA and the right pair of Y-direction magnets MYB. The Z-direction magnets MZA, MZB and MZC are made of permanent magnets identical in specification and fixed to the rear of the front fixed yoke 62. Each Z-direction magnet MZA, MZB and MZC is a plate-like magnet which is rectangular (substantially square) in shape as viewed from the front. The front side of each Z-direction magnet MZA, MZB and MZC (the surface thereof which is in contact with the front fixed yoke 62) is the south pole, while the rear side of each Z-direction magnet MZA, MZB and MZC is the north pole. The three Z-direction magnets MZA, MZB and MZC are arranged in a plane orthogonal to the Z-axis at substantially equi-angular intervals about the Z-axis. With the passage of magnetic flux of each Z-direction magnet MZA, MZB and MZC through the front fixed yoke 62 and the rear fixed yoke 63, a portion of magnetic circuits (thrust generator/thrust controller) which generate thrust in the Z-direction (the first direction) is formed between the Z-direction magnet MZA and the facing portion of the rear fixed yoke 63 which faces the same Z-direction magnet MZA, a portion of magnetic circuits (thrust generator/thrust controller) which generate thrust in the Z-direction (the first direction) is formed between the Z-direction magnet MZB and the facing portion of the rear fixed yoke 63 which faces the same Z-direction magnet MZB, and a portion of magnetic circuits (thrust generator/thrust controller) which generate thrust in the Z-direction (the first direction) is formed between the Z-direction magnet MZC and the facing portion of the rear fixed yoke 63 which faces the same Z-direction magnet MZC.

The movable stage 61, which is positioned between the front fixed yoke 62 and the rear fixed yoke 63, is a non-magnetic member which is formed of a nonmagnetic material as a single-piece member by press-molding. The movable stage 61 is provided at a central portion thereof with an image sensor mounting hole 61a, having the shape of a rectangle as viewed from the front, and the image sensor 31 is fitted into the image sensor mounting hole 61a and fixed thereto. The image sensor 31 protrudes from the image sensor mounting hole 61a forwardly toward the front of the movable stage 61 in the optical axis direction.

When the movable stage 61 sits at the initial position (with the movable stage 61 magnetically levitated), the image sensor 31 is positioned so that the long sides of the image sensor 31 extend parallel to the X-axis and so that the short sides of the image sensor 31 extend parallel to the Y-axis. When the movable stage 61 sits at the initial position, the center of the imaging surface of the image sensor 31 is positioned on the optical axis O of the photographic lens 101, and the optical axis O and the Z-axis are aligned with each other. The Z-direction (the first direction), the X-direction (the second direction) and the Y-direction (the third direction) will be hereinafter described as fixed directions with respect to the camera body 11 and the photographic lens 101, with the Z-direction parallel to (including being aligned with) the optical axis O; however, the Z-direction (the first direction), the X-direction (the second direction) and the Y-direction (the third direction) can be fixed directions with respect to the image sensor 31.

The stage apparatus 60 is provided with a pair of X-drive coils (X-driver) CX which are fixed to the movable stage 61 on either side (left and right sides) of the image sensor 31 in the X-direction to be located to the left and right of the left and right sides (short sides) of the image sensor 31, respectively. The stage apparatus 60 is provided with a pair of Y-drive coils: a Y-drive coil (YA-driver) CYA and a Y-drive coil (YB-driver) CYB which are fixed to the movable stage 61 to be located below the lower side (long side) of the image sensor 31 and to be spaced from each other in the leftward and rightward directions (i.e., in the X-direction). The pair of X-drive coils (X-driver) CX are vertically elongated in the Y-direction and arranged at symmetrical positions with respect to the Y-axis (at equi-distant positions from the Y-axis) so that the longitudinal directions of the pair of X-drive coils CX extend parallel to the Y-direction and intersect the X-axis. The pair of Y-drive coils CYA and CYB are laterally elongated in the X-direction and arranged at symmetrical positions with respect to the Y-axis (at equi-distant positions from the Y-axis) so that the longitudinal directions of the pair of Y-drive coils CYA and CYB extend parallel to the X-direction. According to this arrangement, manufacture, adjustment and control of the stage apparatus 60 is facilitated.

The stage apparatus 60 is further provided with three circular coils: a Z-drive coil (ZA-driver) CZA, a Z-drive coil (ZB-driver) CZB and a Z-drive coil (ZC-driver) CZC which are fixed to the movable stage 61. The Z-drive coil CZA is fixed at a position (middle position) between the pair of Y-drive coils CYA and CYB, and the Z-drive coils CZB and CZC are fixed above the pair of X-drive coils CX, respectively. The Z-drive coil CZA is arranged on the Y-axis, and the Z-drive coils CZB and CZC are arranged to be symmetrical with respect to the Y-axis (at equi-distant positions from the Y-axis). The center of gravity (the center of gravity of the whole) of the Z-drive coils CZA, CZB and CZC is substantially coincident with the center of gravity of the movable stage 61. It is desirable that the Z-drive coils CZA, CZB and CZC be arranged so that a line which connects two of the three Z-drive coils CZA, CZB and CZC extends parallel to one of the X-axis and the Y-axis, and so that a line which extends from the remaining one of the three Z-drive coils CZA, CZB and CZC and is orthogonal to the aforementioned connecting line extends parallel to (or aligns with) the other of the X-axis and the Y-axis. In the first embodiment of the stage apparatus, the Z-drive coils CZA, CZB and CZC are arranged so that a line which connects the two Z-drive coils CZB and CZC extends parallel to the X-axis and so that a line which extends from the Z-drive coil CZA and is orthogonal to the aforementioned connecting line aligns with the Y-axis as shown in FIG. 2A. According to this arrangement, manufacture, adjustment and control of the stage apparatus 60 is facilitated.

The pair of X-drive coils CX, the pair of Y-drive coils CYA and CYB and the three Z-drive coils CZA, CZB and CZC are flat (thin) coils which are arranged to be parallel to a plane (X-Y plane) orthogonal to the optical axis O. Each of these seven flat coils is made of a plurality of turns of a conductive wire wound in the X-Y plane which are in turn multi-layered in the thickness direction of the movable stage 61 (i.e., in the Z-direction).

The pair of X-drive coils CX are arranged so that the long portions (long sides) thereof extend parallel to the Y-axis and so that the long portions (long sides) of each X-drive coil CX face the associated pair of X-direction magnets MX in the Z-direction. The pair of Y-drive coils CYA and CYB are arranged so that the long portions (long sides) thereof extend parallel to the X-axis and so that the long portions (long sides) of each Y-drive coil CYA and CYB face the associated pair of Y-direction magnets MYA or MYB in the Z-direction.

The pair of X-drive coils (X-driver) CX, the Y-drive coil (YA-driver) CYA, the Y-drive coil (YB-driver) CYB, the Z-drive coil (ZA-driver) CZA, the Z-drive coil (ZB-driver) CZB and the Z-drive coil (ZC-driver) CZC are all connected to an actuator drive circuit 42 (see FIG. 1), and the passage of electric current through each of these seven coils is controlled via the actuator drive circuit 42.

Each X-drive coil CX and the associated pair of X-direction magnets MX constitute a second thrust generator (thrust controller/X-direction thrust generator) which generates thrust in the X-direction (the second direction). The movable stage 61 can be translated in the X-direction by the thrust force in the X-direction which is generated by controlling the current through the pair of X-drive coils CX.

The Y-drive coil CYA and the associated pair of Y-direction magnets MYA, and the Y-drive coil CYB and the associated pair of Y-direction magnets MYB constitute a pair of third thrust generators (thrust controllers/Y-direction thrust generators), each of which generates thrust in the Y-direction (the third direction). The movable stage 61 can be translated in the Y-direction and turned (rotated) about the Z-direction by interaction of two thrust forces in the Y-direction which are generated by controlling the currents through the pair of Y-drive coils CYA and CYB, which are spaced from each other in the X-direction.

The three Z-drive coils CZA, CZB and CZC and the three Z-direction magnets MZA, MZB and MZC constitute three first thrust generators (thrust controllers/Z-direction thrust generators), each of which generates thrust in the Z-direction. The movable stage 61 is levitated without contacting either the front fixed yoke 62 or the rear fixed yoke 63 (the Z-direction magnets MZA, MZB and MZC); hence, the movable stage 61 can be translated in the Z-direction, tilted about the X-direction and tilted about the Y-direction by interaction of three thrust forces in the Z-direction which are generated by controlling the currents through the three Z-drive coils CZA, CZB and CZC.

In addition, the movable stage 61 can be held at the initial position (central position) in a levitation state (neutral state) by interaction of thrust forces in the X-direction and the Y-direction which are generated by controlling the currents through the pair of X-drive coils CX and the pair of Y-drive coils CYA and CYB.

The stage apparatus 60 is provided with two X-direction Hall elements (X-position detectors/magnetic sensors) HX, a Y-direction Hall element (YA-position detector/magnetic sensor) HYA, a Y-direction Hall element (YB-position detector/magnetic sensor) HYB, a Z-direction Hall element (ZA-position detector/magnetic sensor) HZA, a Z-direction Hall element (ZB-position detector/magnetic sensor) HZB and a Z-direction Hall element (ZC-position detector/magnetic sensor) HZC which are all fixed to the movable stage 61. The X-direction Hall elements HX are positioned in the air-core areas of the X-drive coils CX, respectively. The Y-direction Hall elements HYA and HYB are positioned in the air-core areas of the Y-drive coils CYA and CYB, respectively. The Z-direction Hall elements HZA, HZB and HZC are positioned in the air-core areas of the Z-drive coils CZA, CZB and CZC, respectively. The X-direction Hall elements (X-position detectors) HX, the Y-direction Hall element (YA-position detector) HYA, the Y-direction Hall element (YB-position detector) HYB, the Z-direction Hall element (ZA-position detector) HZA, the Z-direction Hall element (ZB-position detector) HZB and the Z-direction Hall element (ZC-position detector) HZC are all connected to a position detection circuit (processor) 43 (see FIG. 1).

Each X-direction Hall element HX constitutes a position detector which detects the magnetic force of the associated pair of X-direction magnets MX (magnetic flux of the X-direction magnetic circuit). The position detection circuit 43 detects the position of the movable stage 61 in the X-direction by performing arithmetic computations based on detection signals input from the X-direction Hall elements HX. The translation position of the movable stage 61 in the X-direction can be detected from detection signals output from the X-direction Hall elements HX.

The Y-direction Hall element HYA constitutes a position detector which detects the magnetic force of the associated pair of Y-direction magnets MYA (magnetic flux of the Y-direction magnetic circuit) and the Y-direction Hall element HYB constitutes a position detector which detects the magnetic force of the associated pair of Y-direction magnets MYB (magnetic flux of the Y-direction magnetic circuit).

The position detection circuit 43 detects the translation position of the movable stage 61 in the Y-direction and the turning position (rotational position) of the movable stage 61 about the Z-axis by performing arithmetic computations based on detection signals input from the Y-direction Hall elements HYA and HYB. The translation position of the movable stage 61 in the Y-direction and the turning position (rotational position) of the movable stage 61 about the Z-direction can be detected from detection signals output from the Y-direction Hall elements HYA and HYB.

Each Z-direction Hall element HZA, HZB and HZC constitutes a position detector which detects the magnetic force of the associated Z-direction magnet MZA, MZB or MZC (magnetic flux of the Z-direction magnetic circuit). The position detection circuit 43 detects the translation position of the movable stage 61 in the Z-direction, the tilting position of the movable stage 61 about the X-direction and the tilting position of the movable stage 61 about the Y-direction by performing arithmetic computations based on detection signals input from the Z-direction Hall elements HZA, HZB and HZC. The position of the movable stage 61 in the Z-direction, the tilting position of the movable stage 61 about the X-direction and the tilting position of the movable stage 61 about the Y-direction can be detected from detection signals input from the Z-direction Hall elements HZA, HZB and HZC.

The position detection circuit 43 constitutes a processor for calculating the translation positions of the movable stage 61 in the Z-direction (the first direction), the X-direction (the second direction) and the Y-direction (the third direction), the turning (rotational) position of the movable stage 61 about the Z-direction (the first direction), and the tilting (rotational) positions of the movable stage 61 above the X-direction (the second direction) and the Y-direction (the third direction) from detection signals input from the Z-direction Hall elements HZA, HZB and HZC.

The X-drive coils CX, the Y-drive coils CYA and CYB and the Z-drive coils CZA, CZB and CZC, the X-direction Hall elements HX, the Y-direction Hall elements HYA and HYB and the Z-direction Hall elements HZA, HZB and HZC are mounted on a flexible printed circuit (FPC) board (not shown) and are electrically connected to a circuit incorporated in the camera body 11 such as the actuator drive circuit 42 or the position detection circuit 43 via a flexible printed wiring board (flexible PWB) (not shown) which extends from the movable stage 61 (see FIG. 1).

The actuator drive circuit 42 controls energization of the pair of X-drive coils CX, the pair of Y-drive coils CYA and CYB, and the three Z-drive coils CZA, CZB and CZC. The operation of the actuator drive circuit 42 is controlled by the body CPU 20 via an anti-shake control circuit 41 which is connected between the body CPU 20 and the actuator drive circuit 42 as shown in FIG. 1.

The position detection circuit 43 detects the positions of the movable stage 61 in the X-direction, the Y-direction and the Z-direction, the tilting direction of the movable stage 61 about the X-direction (the tilting (rotating) angle/pitch angle about the X-direction), the tilting direction of the movable stage 61 about the Y-direction (the tilting (rotating) angle/yaw angle about the Y-direction) and the turning direction of the movable stage 61 about the Z-direction (the turning (rotating) angle/roll angle about the Z-direction) from detection signals output from the X-direction Hall elements HX, the Y-direction Hall elements HYA and HYB and the Z-direction Hall elements HZA, HZB and HZC.

In the digital camera 10 during a photographing operation, firstly, the movable stage 61 is held at an initial position between the front fixed yoke 62 and the rear fixed yoke 63 in a noncontact (levitation) state with the front fixed yoke 62 and the rear fixed yoke 63 by the body CPU 20 controlling the energization of the pair of X-drive coils CX, the pair of Y-drive coils CYA and CYB and the three Z-drive coils CZA, CZB and CZC.

In addition, based on each of the above described positions of the movable stage 61 calculated by the body CPU 20 (the position detection circuit 43), the digital camera 10 is capable of performing the following drive control processes while levitating the movable stage 61.

The movable stage 61 can be held at a predetermined position in the optical axis direction and be translated in the Z-direction by interaction of three thrust forces of the same magnitude in the Z-direction which are generated by equally controlling the currents through the three Z-drive coils CZA, CZB and CZC, and the movable stage 61 can be tilted about the X-direction and also tilted about the Y-direction, and held thereat, by interaction of three thrust forces of different magnitudes in the Z-direction which are generated by individually controlling the currents through the three Z-drive coils CZA, CZB and CZC.

The movable stage 61 can be translated in the X-direction with thrust forces in the X-direction, which are generated by controlling the current through each X-direction drive coil CX, and held at a predetermined position in the X-direction.

The movable stage 61 can be held at a predetermined position in the Y-direction and translated in the Y-direction by interaction of two thrust forces of the same magnitude in the Y-direction which are generated by equally controlling the currents through the two Y-drive coils CYA and CYB, and the movable stage 61 can be turned (rotated) about the Z-direction, and held thereat, by interaction of two thrust forces of different magnitudes in the Y-direction which are generated by individually controlling the currents through the two Y-drive coils CYA and CYB.

Hence, the movable stage 61 can be translated, tilted/turned, tilted/turned while being translated, translated after being tilted/turned, and tilted/turned after being translated in all six directions with six-degrees of freedom (6 DoF) by interaction of thrust forces in the Z-direction, a thrust forces in the X-direction and thrust forces in the Y-direction which are generated by the above described drive coils: the X-drive coils CZA, CZB and CZC, the X-drive coils CX and the Y-drive coils CYA and CYB.

The body CPU 20 performs an image shake correction operation by performing the above described drive controls in synchronization with shaking (vibrations) (caused by hand shake) of the camera body 11 which is detected by the camera shake detecting circuit 44.

Second Embodiment

FIGS. 6A through 8 show the second embodiment of the stage apparatus according to the present invention. All the permanent magnets (MX, MYA, MYB, MZA, MZB and MZC) are provided only on the front fixed yoke 62 in the above described first embodiment of the stage apparatus, whereas the permanent magnets are divided to be provided on the front and rear fixed yokes 62 and 63 in the second embodiment of the stage apparatus. Elements of the second embodiment of the stage apparatus which are similar to those of the first embodiment of the stage apparatus are designated by the same reference numerals, and descriptions of these similar elements are omitted.

The second embodiment of the stage apparatus 60 is provided with a left pair of X-direction magnets MX1, a right pair of X-direction magnets MX1, a left pair of Y-direction magnets MYA1, a right pair of Y-direction magnets MYB1 and three Z-direction magnets MZA1, MZB1 and MZC1 which are fixed to the rear fixed yoke 63 to face the left pair of X-direction magnets MX, the right pair of X-direction magnets MX, the left pair of Y-direction magnets MYA, the right pair of Y-direction magnets MYB and the three Z-direction magnets MZA, MZB and MZC, respectively. The left pair of X-direction magnets MX1, the right pair of X-direction magnets MX1, the left pair of Y-direction magnets MYA1, the right pair of Y-direction magnets MYB1 and the three Z-direction magnets MZA1, MZB1 and MZC1 are identical in specification to the left pair of X-direction magnets MX, the right pair of X-direction magnets MX, the left pair of Y-direction magnets MYA, the right pair of Y-direction magnets MYB and the three Z-direction magnets MZA, MZB and MZC, respectively. The X-direction magnets MX1 and the Y-direction magnets MYA1 and MYB1, which are fixed to the rear fixed yoke 63, are positioned with respect to the X-direction magnets MX and the Y-direction magnets MYA and MYB, which are fixed to the front fixed yoke 62, so that opposite magnetic poles (north and south) of these magnets are placed face-to-face in the Z-direction (see FIGS. 6B and 7). On the other hand, the Z-direction magnets MZA1, MZB1 and MZC1, which are fixed to the rear fixed yoke 63, are positioned with respect to the Z-direction magnets MZA, MZB and MZC, which are fixed to the front fixed yoke 62, so that the same magnetic poles of these magnets are placed face-to-face in the Z-direction (see FIG. 8). The distances between each pair of X-direction magnets MX1 and the associated pair of X-direction magnet MX, between each pair of Y-direction magnets MYA1 and MYB1 and the associated pair of Y-direction magnets MYA or MYB, and between each Z-direction magnet MZA1, MZB1 and MZC1 and the associated Z-direction magnet MZA, MZB or MZC in the second embodiment of the stage apparatus are set to be substantially identical to those between each pair of X-direction magnets MX and the rear fixed yoke 63, between each pair of Y-direction magnets MYA, MYB and MYC and the rear fixed yoke 63, and between each Z-direction magnet MZA, MZB and MZC and the rear fixed yoke 63 in the first embodiment of the stage apparatus, respectively.

According to the second embodiment of the stage apparatus, the magnetic field lines can be made to be substantially orthogonal to the optical axis O (the Z-axis) because each pair of X-direction magnets MX and the associated pair of X-direction magnets MX1 are positioned so that opposite magnetic poles of these magnets face each other with the long portions (long sides) of the associated X-drive coil CX positioned therebetween and because each pair of Y-direction magnets MYA and MYB and the associated pair of X-direction magnets MYA1 or MYB1 are positioned so that opposite magnetic poles of these magnets face each other with the long portions (long sides) of the associated Y-drive coil CYA or CYB positioned therebetween, and accordingly, the thrust (driving force) in the X-direction and in the Y-direction does not fluctuate even if the movable stage 61 moves in the Z-direction.

Additionally, the thrust (driving force) in the Z-direction fluctuates little even if the Z-direction drive coils CZA, CZB and CZC (the movable stage 61) move in the Z-direction compared with the first embodiment of the stage apparatus because each Z-direction magnet MZA, MZB and MZC on the front fixed yoke 62 and the associated Z-direction magnet MZA1, MZB1 or MZC1 on the rear fixed yoke 63 are positioned so that the same magnetic poles of these magnets face each other with the associated ring-shaped Z-drive coil CZA, CZB or CZC on the movable stage 61 positioned therebetween.

Third Embodiment

In the above illustrated first and second embodiments, the position of the movable stage 61 in the Z-direction, the tilting position of the movable stage 61 about the X-direction and the tilting position of the movable stage 61 about the Y-direction are detected using the Z-direction Hall elements HZA, HZB and HZC. FIGS. 9 and 10 show the third embodiment of the stage apparatus. In this embodiment, the Hall elements HZA, HZB and HZC that are used in the first and second embodiments are replaced by photo reflectors PZA, PZB and PZC as a Z-direction position detector for detecting the position of the movable state 61 in the Z-direction, a tilting position detector for detecting the position of the movable state 61 about the X-direction and also a tilting position detector for detecting the position of the movable state 61 about the Y-direction. Elements of the third embodiment of the stage apparatus which are similar to those of the first and second embodiments of the stage apparatuses are designated by the same reference numerals, and descriptions of these similar elements are omitted.

The photo reflectors PZA, PZB and PZC are each provided with alight emitting element (not shown) and a light receiving element (not shown). Light emitted from the light emitting element is reflected by a reflecting area 61b (see FIG. 10) on the movable stage 61 is received by the light receiving element, and the distance between each photo reflector PZA, PZB and PZC and the movable stage 61 (the reflecting area 61b) in the Z-direction is detected from the light-receiving position on the light receiving element of the photo reflector.

In the third embodiment of the stage apparatus, when the movable stage 61 moves in the X-direction and the Y-direction, the position of the movable stage 61 in the Z-direction can be precisely detected with the photo reflectors PZA, PZB and PZC regardless of the position of the movable stage 61 in the X-direction, the position of the movable stage 61 in the Y-direction or the turning position of the movable stage 61 about the Z-direction.

Fourth Embodiment

In the above illustrated first, second and third embodiments, the image sensor 31 is fixed to the movable stage 61, and the movable stage 61 is held in a noncontact (levitation) state with the front fixed yoke 62 and the rear fixed yoke 63 and driven in the six-axis directions (with six degrees of freedom (6 DoF)). Whereas, the fourth embodiment of the stage apparatus shown in FIGS. 11A through 12B is provided on the movable stage 61 with piezoelectric elements 71a, 71b and 71c by which the image sensor 31 can be translated in the Z-direction and tilted about the X-direction and the Y-direction. Elements of the fourth embodiment of the stage apparatus which are similar to those of the first through third embodiments of the stage apparatuses are designated by the same reference numerals, and descriptions of these similar elements are omitted.

The three piezoelectric elements 71a, 71b and 71c connect the rear surface (back surface) of the image sensor 31 and the front surface of the movable stage 61 via three extendable-and-retractable members 72a, 72b and 72c, respectively. The piezoelectric element 71a is positioned at an approximate center of the lower edge of the image sensor 31 in the X-direction, while the piezoelectric elements 71b and 71c are positioned in the vicinity of the left and right ends (the right and left ends with respect to FIG. 11A) of the upper edge of the image sensor 31, respectively. It is desirable that the three piezoelectric elements 71a, 71b and 71c be arranged at equi-angular intervals about the optical axis O (the Z-axis).

Each piezoelectric element 71a, 71b and 71c is a single body of a piezoelectric element or a laminated body of piezoelectric elements which expand and contract (generates thrust) in the Z-direction in accordance with the magnitude and polarity of voltage upon application of this voltage to the piezoelectric element. The piezoelectric elements 71a, 71b and 71c are driven and controlled by a piezoelectric element drive circuit (not shown). The extendable-and-retractable members 72a, 72b and 72c are made of an elastic material such as rubber. Each piezoelectric element 71a, 71b and 71c constitutes a first thrust generator which generates thrust in the Z-direction (first direction).

Figure 12A:
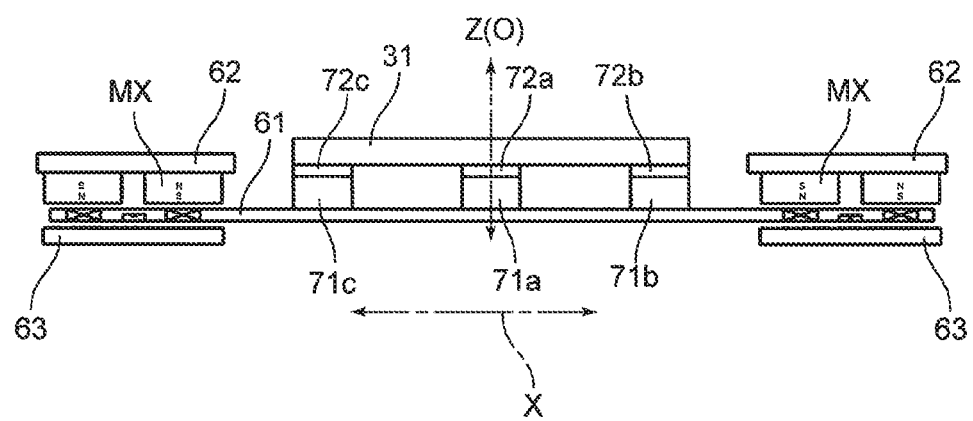
FIGS. 12A and 12B are sectional views taken at the same position as FIG. 11B, illustrating an example of different operating manners of the Z-direction driver in the fourth embodiment of the stage apparatus.

FIG. 12A shows the case where voltages of substantially the same magnitude are applied to the piezoelectric elements 71a, 71b and 71c so that the piezoelectric elements 71a, 71b and 71c expand having substantially the same length in the Z-direction. In FIG. 12A, the piezoelectric elements 71a, 71b and 71c expand by substantially equal amounts from the initial state shown in FIG. 11B, so that the image sensor 31 is spaced (translated) from the movable stage 61. When the voltages applied to the piezoelectric elements 71a, 71b and 71c are reversed, the piezoelectric elements 71a, 71b and 71c contract, which causes the image sensor 31 to be translated in a direction toward the movable stage 61.

Figure 12B:
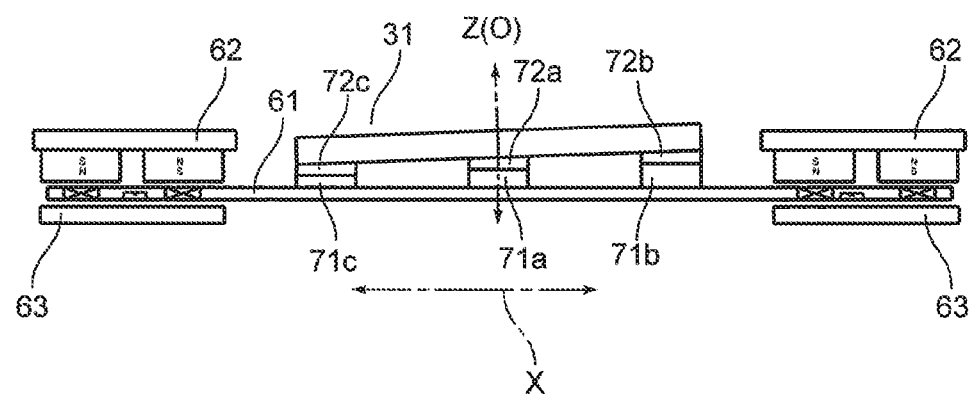

When the voltages applied to the piezoelectric elements 71a, 71b and 71c and the polarities thereof are independently adjusted, each piezoelectric element 71a, 71b and 71c expands or contracts to thereby generate thrust in the Z-direction, which causes the image sensor 31 to be translated in the Z-direction, tilted about the X-direction or tilted about the Y-direction relative to the movable stage 61 by interaction of three thrust forces in the Z-direction which are generated by controlling the currents through the three Z-drive coils CZA, CZB and CZC. FIG. 12B shows a state where the image sensor 31 has been tilted about the Y-direction relative to the movable stage 61 by making each of the piezoelectric elements 71a and 71c contract and making the piezoelectric element 71b expand. In association with the expansion/contraction of the piezoelectric elements 71a, 71b and 71c, the extendable-and-retractable members 72a, 72b and 72c, via which each piezoelectric element 71a, 71b and 71c and the image sensor 31 are connected, are elastically deformed to allow the image sensor 31 to tilt.

The fourth embodiment of the stage apparatus can adopt the same mechanism as the mechanism in each of the above illustrated first through third embodiments which is capable of levitating the movable stage 61 and turning (rotating) the movable stage 61 about the Z-direction and translating the movable stage 61 in the X-direction and the Y-direction.

In the above illustrated first through fourth embodiments, the thrust generators can be configured to be compact in size within a narrow area since the Z-drive coil (ZA-driver) CZA, which is provided as an element of one of the three Z-direction thrust generators, is positioned on the movable stage 61 at a position between the pair of Y-drive coils CYA and CYB, which are provided as elements of the two Y-direction thrust generators.

In the above illustrated first through fourth embodiments, since the center of gravity of the three Z-drive coils (the ZA-driver, the ZB-driver and the ZC-driver) CZA, CZB and CZC is substantially coincident with the center of gravity of the movable stage 61, the thrust forces (driving forces) of the Z-direction thrust generators can be equalized, which allows the thrust force (driving force) of each Z-direction thrust generator to be set to a small value.

The above described arrangement of the three Z-drive coils (the ZA-driver, the ZB-driver and the ZC-driver) CZA, CZB and CZC in which a line which connects two of the three Z-drive coils CZA, CZB and CZC extends parallel to one of the X-axis and the Y-axis and a line which extends from the remaining one of the three Z-drive coils CZA, CZB and CZC and is orthogonal to the aforementioned connecting line extends parallel to (or coincides with) the other of the X-axis and the Y-axis makes it possible to make the detection axis and the control axis of a gyro sensor coincide with each other, which makes it possible to simplify the configuration of the control system. For instance, tilting of the movable stage 61 about the Y-direction can be controlled by the difference between thrust forces generated by the ZC-driver and the ZB-driver, while turning of the movable stage 61 about the Z-direction can be controlled by the ZA-driver.

Figure 13:
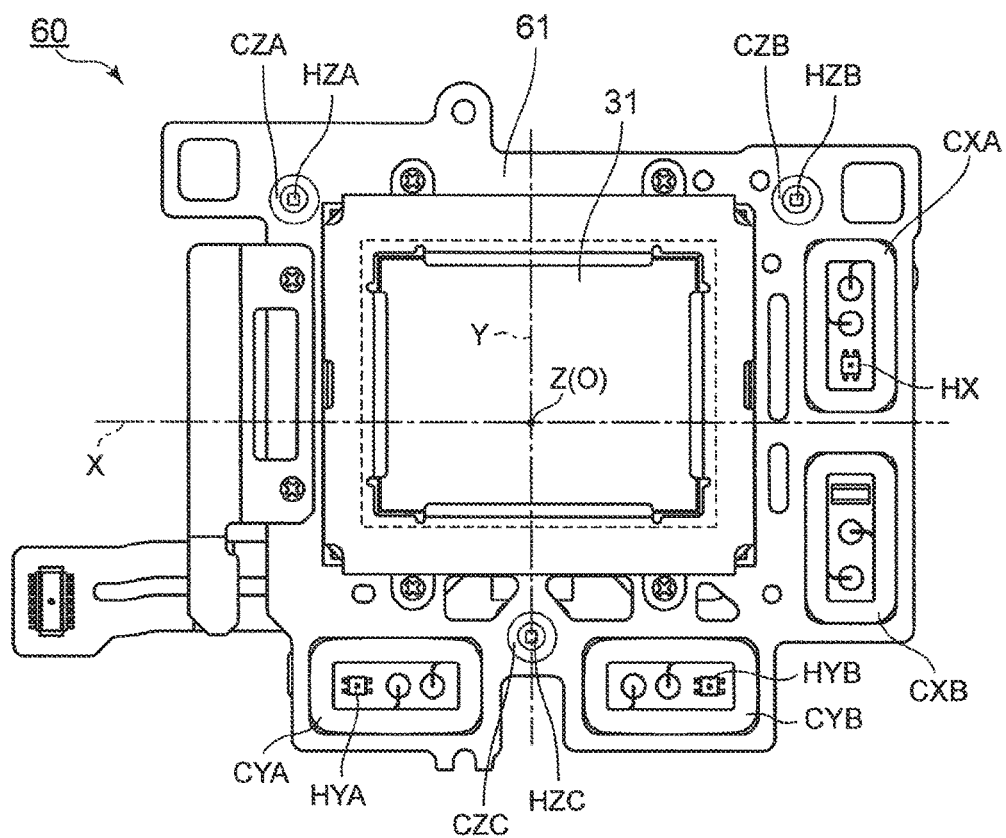
FIG. 13 is a rear elevational view of a fifth embodiment of the stage apparatus according to the present invention.

In the above illustrated first through fourth embodiments, the pair of X-drive coils CX that are identical in specification are provided at either side of the image sensor 31 of the movable stage 61 in the X-direction to be located to the left and right of the left and right sides (short sides) of the image sensor 31, respectively, and the left pair of X-direction magnets MX and the right pair of X-direction magnets MX, each pair being made of two permanent magnets identical in specification, are provided on either side of the opening 62a of the front fixed yoke 62 in the leftward and rightward directions (additionally, the left pair of X-direction magnets MX1 and the right pair of X-direction magnets MX1, each pair being made of two permanent magnets identical in specification, are provided on either side of the opening 63a of the rear fixed yoke 63 in the leftward and rightward directions in the second embodiment of the stage apparatus). However, the two pairs of X-direction magnets MX (and the two pairs of X-direction magnets MX1 in the second embodiment shown in FIGS. 6 through 8) and the pair of X-drive coils CX can be provided only on one of the left and right sides of the opening 62a. FIG. 13 shows a fifth embodiment of the stage apparatus having such a structure. FIG. 13 is a rear elevational view of the fifth embodiment of the stage apparatus 60. Elements of the fifth embodiment of the stage apparatus which are similar to those of the embodiments of the stage apparatuses shown in FIGS. 2A through 12B are designated by the same reference numerals, and descriptions of these similar elements are omitted.

The stage apparatus 60 is provided with a pair of X-drive coils (upper and lower X-drive coils) CXA and CXB, which are identical in specification. The pair of X-drive coils CXA and CXB are aligned in the Y-direction and arranged on the right-hand side of the image sensor 31 at upper and lower positions with respect to the X-axis to be spaced from each other in the Y-direction with the longitudinal direction of each X-drive coil CXA and CXB extending parallel to the Y-axis, which is orthogonal to the optical axis O. The fifth embodiment of the stage apparatus 60 is provided in the air-core area of the upper X-drive coil CXA with an X-direction Hall element (X-position detector) HX. Although not shown in FIG. 13, an upper pair of X-direction magnets (left and right X-direction magnets) and a lower pair of X-direction magnets (left and right X-direction magnets), each pair being made of two permanent magnets identical in specification, are arranged on portions of the front fixed yoke (not shown in FIG. 13) which face the upper X-drive coil CXA and the lower X-drive coil CXB, respectively, and another upper pair of X-direction magnets (left and right X-direction magnets) and another lower pair of X-direction magnets (left and right X-direction magnets), each pair being made of two permanent magnets identical in specification, are arranged on portions of the rear fixed yoke (not shown in FIG. 13) which face the upper X-drive coil CXA and the lower X-drive coil CXB, respectively, to form upper and lower magnetic circuits (thrust generators) which generate thrust in the X-direction. In this embodiment, a translational driving force in the X-direction is generated by interaction of thrust forces in the X-direction which are generated by performing the same energization control on the pair of X-drive coils CXA and CXB, which makes it possible to translate the movable stage 61 in the X-direction.

The stage apparatus can be provided with only one X-drive coil CX. In such a case, it is desirable that the X-drive coil CX be positioned to lie on the X-axis as viewed in the Z-direction.

In the above illustrated first through fifth embodiments, the drive coils are mounted to the movable stage (movable member), while the permanent magnets are mounted to a fixed yoke (s) (stationary base member (s)). However, in a stage apparatus according to the present invention, it is possible for the drive coils and the permanent magnets to be mounted to a fixed yoke (s) (stationary base member (s)) and the movable stage (movable member), respectively.

Figure 14:
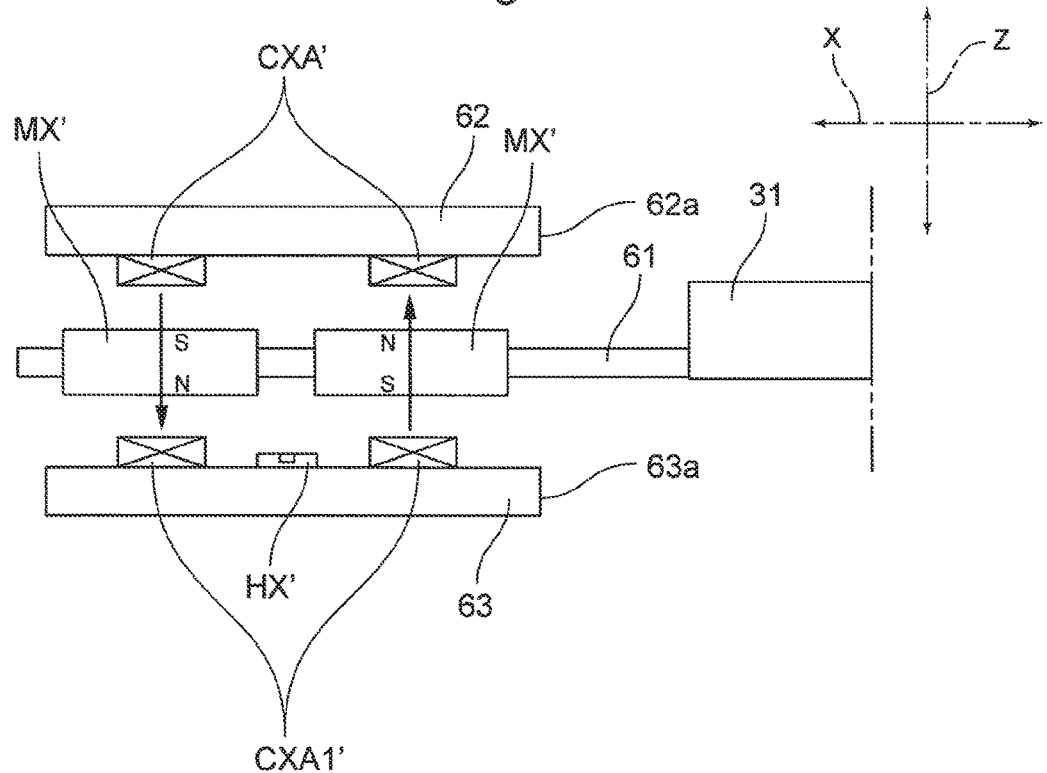
FIG. 14 is an enlarged sectional view of one of a pair of X-direction drivers of a sixth embodiment of the stage apparatus.
Figure 15:
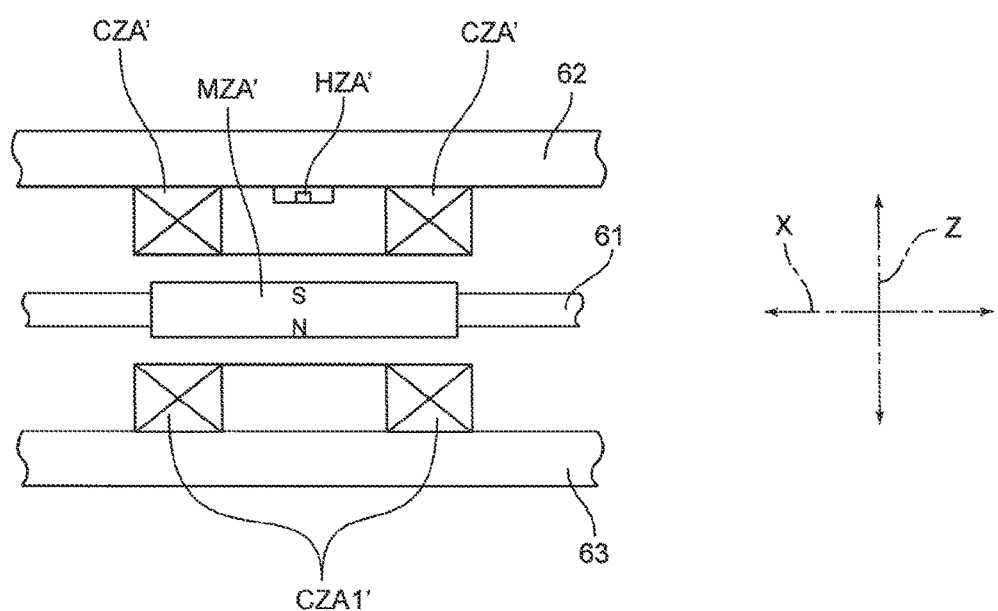
FIG. 15 is an enlarged sectional view of the Z-direction driver in the embodiment of the stage apparatus shown in FIG. 14.

FIGS. 14 and 15 show the sixth embodiment of the stage apparatus, in which the drive coils are mounted to the front and rear fixed yokes (stationary base members) while the permanent magnets are mounted to the movable stage (movable member). FIGS. 14 and 15 are sectional views taken at the same position as the sectional views shown in FIGS. 7 and 8. Elements of the sixth embodiment of the stage apparatus which are similar to those of the embodiments of the stage apparatuses shown in FIGS. 2A through 13 are designated by the same reference numerals, and descriptions of these similar elements will be omitted.

An X-drive coil CXA1' and a Z-drive coil CZA1' are fixed to the front fixed yoke 62, while an X-drive coil CXA' and a Z-drive coil CZA' are fixed to the rear fixed yoke 63 at positions facing the X-drive coil CXA1' and the Z-drive coil CZA1', respectively. A pair of X-direction magnets MX', which is fixed to the movable stage 61, are positioned between the X-drive coil CXA1' and the X-drive coil CXA'. A Z-direction magnet MZA', which is fixed to the movable stage 61, is positioned between the X-drive coil CZA1' and the X-drive coil CZA'. An X-direction Hall element (X-position detector) HX' is fixed to at least one of the front fixed yoke 62 and the rear fixed yoke 63. In the present embodiment shown in FIGS. 14 and 15, the X-direction Hall element is fixed to the rear fixed yoke 63 and positioned in the air-core area of the X-drive coil CXA1'. A Z-direction Hall element (Z-position detector) HZA' is fixed to at least one of the front fixed yoke 62 and the rear fixed yoke 63. In the present embodiment shown in FIGS. 14 and 15, the Z-direction Hall element is fixed to the front fixed yoke 62 and positioned in the air-core area of the Z-drive coil CZA'. A front and rear pair of Y-drive coils (not shown) are fixed to the front fixed yoke 62 and the rear fixed yoke 63, respectively, a Y-direction Hall element (not shown) is fixed to one of the front fixed yoke 62 and the rear fixed yoke 63 and positioned in the air-core area of the Y-drive coil which is fixed to this one fixed yoke 62 or 63, and a pair of Y-direction magnets (not shown) are fixed to the movable stage 61 to be positioned between the pair of Y-drive coils that face each other.

In the sixth embodiment of the stage apparatus, the movable stage 61 is levitated, translated, tilted, tilted while being translated, or tilted and thereupon translated while maintaining the tilted state by controlling the currents through the X-drive coils CXA1' and CXA', the Z-drive coils CZA1' and CZA' and the pair of Y-drive coils (not shown).

In the sixth embodiment of the stage apparatus, all the drive coils and Hall elements are fixed to the front fixed yoke 62 and the rear fixed yoke 63 that are stationary base members, and all the permanent magnets (drive magnets) are fixed to the movable stage 61 that is a movable member. This structure reduces the number of flexible PWBs extended from the movable stage 61, so that the load of the flexible PWB (s) on the movable stage 61 is reduced, which improves responsiveness of the movable stage 61, thus making it possible to drive the movable stage 61 with high precision. The structure in which the drive coils and the Hall elements are fixed to the front fixed yoke 62 and the rear fixed yoke 63 while the permanent magnets (drive magnets) are fixed to the movable stage 61 can be applied to all the above illustrated embodiments.

In the above illustrated first through sixth embodiments, the first direction is defined as the Z-direction (the Z-axis) that is parallel to the optical axis O, and the second direction and the third direction are defined as the X-direction (the X-axis) and the Y-direction (the Y-axis), respectively, which are orthogonal to the Z-direction (the Z-axis). However, in the present invention, the first direction does not necessarily have to be parallel to the optical axis O, and the first, second and third directions do not necessarily have to be orthogonal to one another; each can be set to an arbitrary direction.

Although a Hall element, as an X-direction position detector, is installed in the air-core area of each of the left and right X-drive coils CX in the above illustrated first through fourth embodiments, a Hall element can be installed only in one of the air-core areas of the left and right X-drive coils CX. In addition, a Hall element is installed in the air-core area of one or each drive coil but can be installed outside the drive coil (s). In addition to each Hall element detecting the magnetic force of the associated pair of drive magnets in the above illustrated embodiments, it is possible for the stage apparatus to be provided, independently of the drive magnets, with an additional permanent magnet (s) for use in magnetic force detection so that the Hall element detects the magnetic force of this additional permanent magnet (s) instead. Furthermore, each Hall element can be replaced by a different type of magnetic sensor.

The digital camera 10 equipped with one of the above illustrated first through sixth embodiments of the stage apparatuses according to the present invention has a contrast detection type AF (autofocus) function as an AF function. According to this contrast detection type function, the AF Unit 22 detects the contrast of an object via the contrast detector 35 while driving the focusing optical system of the photographic lens 101 in the optical axis direction and detects an in-focus state in which the contrast becomes maximum to bring the object into focus. In the digital camera 10, in addition to an image shake correction operation, a fine focus adjustment can be performed in an AF operation with the stage apparatus 60 by finely moving (translating) the image sensor 31 in the optical axis direction; additionally, it is possible to detect a peak contrast by wobbling the image sensor 31 using the stage apparatus 60.

Additionally, in the digital camera 10, the stage apparatus 60 makes a special photography such as a tilt photography in which the image sensor 31 is tilted with the stage apparatus 60 possible.

The present invention can be applied to various imaging apparatuses such as a so-called mirrorless digital camera, an SLR digital camera, a compact digital camera and a digital video camera (camcorder).

In addition, the present invention can also be applied to not only such imaging apparatuses but also projectors which project images (still/moving images), data, etc. In the case where the stage apparatus 60 is incorporated in a projector, the projector can be provided at an approximate center of the movable stage 61 with an image-forming element (LCD panel/driven member) which allows projection light to be incident thereon from one side (the rear) of the LCD panel in the thickness direction of the movable stage 61 (the first direction/the Z-direction) and to emerge from the LCD panel to travel toward an projector optical system provided on the other side (the front) of the movable stage, or the projector can be provided at an approximate center of the movable stage 61 with a DMD (digital mirror device) panel (projection panel) which reflects the incident projection light, which is incident thereon from a direction different from the first direction (the Z-direction), in the first direction (toward the projector optical system). Alternatively, a projector optical system can be mounted on the movable stage 61 instead of the image-forming element.

Figure 16:
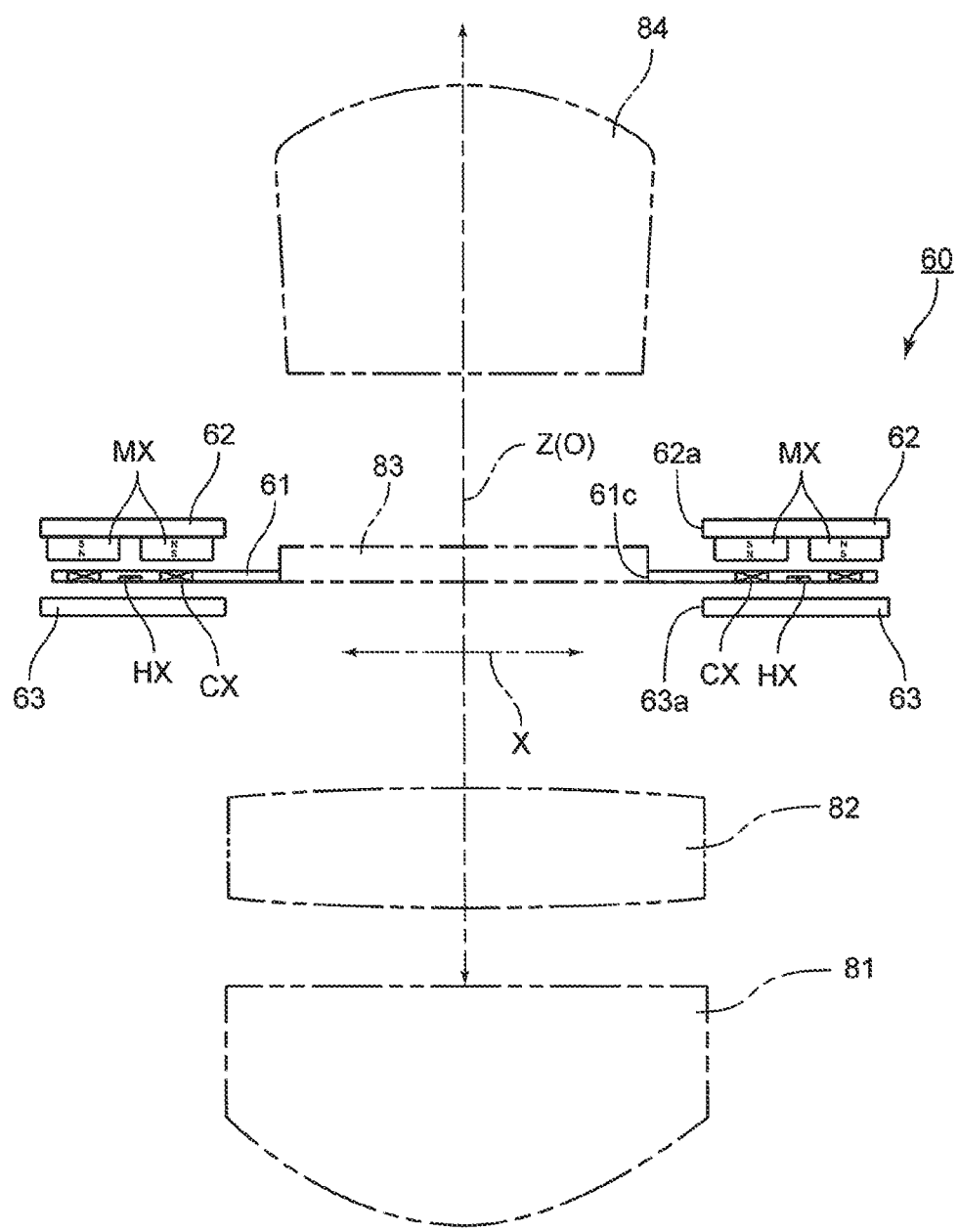
FIG. 16 is a sectional view, corresponding to the sectional view of FIG. 2B, of an embodiment of an image projector apparatus, according to the present invention.

As shown in FIG. 16, the projector equipped with the stage apparatus 60, having the movable stage 61, is provided with a light source 81, a illumination optical system 82 which enables a uniform distribution of light emitted from the light source 81, an image-forming element 83 which forms an image upon receiving illumination light which emerges from the illumination optical system 82, the movable stage 61 on which the image-forming element 83 is mounted in an opening 61c, and the aforementioned projector optical system 84, which projects the image formed by the image-forming element 83. Specific examples of the image-forming element 83 are an LCD panel or a DMD panel. The image-forming element 83 is installed onto a housing of the projector or the projector optical system 84 via the movable stage 61. The image-forming element 83 is positioned inside the projector so that a plane on which the image formed by the image-forming element 83 is formed is orthogonal to the optical axis O of the projector optical system 84 or the optical axis of any one of the lens elements of the projector optical system 84 in a state where the movable stage 61 is not driven (when the movable stage 61 is held at the initial position). The projecting direction and the projection position can be adjusted by changing the direction of the projection light which travels toward the projector optical system 84 after passing through the LCD panel, or changing the direction of the projection light which is reflected by the DMD panel to travel toward the projector optical system 84, or adjusting the orientation of the projection image by translating the movable stage 61 in the Z-direction (first direction), X-direction (second direction) and/or the Y-direction (third direction) and/or rotating (turning) the movable stage 61 about the Z-direction (first direction) and/or rotating (tilting) the movable stage 61 about the X-direction (second direction) and/or the Y-direction (third direction), and the focus state can be adjusted by adjusting the distance between the projector optical system 84 and the LCD panel or the DMD panel.

The present invention can be applied to various imaging apparatuses such as a so-called mirrorless digital camera, an SLR digital camera, a compact digital camera and a digital video camera (camcorder) which have the capability of moving an image sensor. In addition, the present invention can also be applied to not only imaging apparatuses but also projectors which project images (still/moving images), data, etc.

The stage apparatus of the present invention can also be applied to a lens barrel (e.g., a lens barrel disclosed in Japanese Unexamined Patent Publication No. 2015-4769) provided with an image-correction optical system in which one optical element of a photographing optical system is driven. For example, in the photographic lens 101, one or a plurality of optical elements of the photographing optical system can serve as a correction optical element (driven member). In this alternative embodiment shown in FIG. 17, a lens element (driven member) serving as a correction optical element 92 is provided between a first lens group 91 and a second lens group 93. In the present embodiment, the correction optical element 92 is mounted in an opening 61c formed in the approximate center of the movable stage 61. According to the present embodiment, hand-shake correction (image stabilization) and a special photographic effect such as swing and tilt photography by translating the movable stage 61 (correction optical element 92) in the Z-direction (optical axis O direction/first direction), the X-direction (second direction) and/or the Y-direction (third direction), and/or turning (rotating) the movable stage 61 (correction optical element 92) about the Z-direction (first direction), and/or tilting (rotating) the movable stage 61 (correction optical element 92) about the X-direction (second direction) and/or Y-direction (third direction). Furthermore, in the present embodiment, it is possible to carrying out a fine focusing adjustment by finely translating the movable stage 61 (correction optical element 92) in the Z-direction (optical axis O direction/first direction).

Furthermore, the digital camera 10, to which the present invention is applied, can carry out hand-shake correction (image stabilization) and/or a special photographic effect by a combined operation of a hand-shake correction device provided in the photographing lens 101 and a hand-shake correction device provided in the camera body 11.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An imaging apparatus comprising:
   a photographing optical system;
   an image sensor onto which an object image is projected through said photographing optical system;
   a movable stage to which said image sensor is fixed;
   a base which holds said movable stage in a manner to allow said movable stage to move relative to said base; and
   a thrust generator which generates thrust forces in different directions against said movable stage,
   wherein said different directions include a first direction, a second direction and a third direction, said first direction being parallel with a direction of an optical axis of said photographing optical system, and
   wherein, during operation of the thrust generator, an interaction of said thrust forces against said movable stage in at least one of said different directions holds said movable stage in a noncontact state with said base and causes said movable stage to at least one of:

translate relative to said base in said first direction,
translate relative to said base in said second direction,
translate relative to said base in said third direction,
rotate relative to said base about said first direction,
rotate relative to said base about said second direction, and
rotate relative to said base about said third direction.

2. The imaging apparatus according to claim 1, wherein said second direction and said third direction are orthogonal to each other and orthogonal to said first direction,
wherein said thrust generator comprises:
a first thrust generator which generates said thrust force in said first direction;
a second thrust generator which generates said thrust force in said second direction; and
a third thrust generator which generates said thrust force in said third direction,
wherein at least one of said second thrust generator and said third thrust generator comprises a pair of thrust generators which are spaced from each other in one of said second direction and said third direction, and
wherein a pair of thrust forces generated by said pair of thrust generators causes said movable stage to at least one of:
translate in said second direction,
translate in said third direction, and
rotate about said first direction.

3. The imaging apparatus according to claim 2, wherein the other of said second thrust generator and said third thrust generator comprises a second pair of thrust generators which are positioned symmetrically with respect to said optical axis, and
wherein an interaction of said thrust forces in one of said second direction and said third direction, which are generated by said second pair of thrust generators, causes said movable stage to translate in said one of said second direction and said third direction.

4. The imaging apparatus according to claim 2, wherein the other of said second thrust generator and said third thrust generator comprises a second pair of thrust generators which are spaced from each other in one of said second direction and said third direction, and
wherein an interaction of said thrust forces in one of said second direction and said third direction, which are generated by said second pair of thrust generators, causes said movable stage to translate in said one of said second direction and said third direction.

5. The imaging apparatus according to claim 2, wherein said first thrust generator comprises a plurality of thrust generators which are arranged at different positions about said optical axis, and
wherein an interaction of thrust forces in said first direction, which are generated by said plurality of thrust generators of said first thrust generator, causes said movable stage to at least one of translate in said first direction, rotate about said second direction, and rotate about said third direction.

6. The imaging apparatus according to claim 2, wherein said first thrust generator comprises a plurality of thrust generators, at least one of which is positioned between said pair of thrust generators of said one of said second thrust generator and said third thrust generator.

7. The imaging apparatus according to claim 1, wherein the center of gravity of said first thrust generator is coincident with the center of gravity of said movable stage.

8. The imaging apparatus according to claim 1, wherein said thrust generator comprises:
a drive coil fixed to one of said base and said movable stage; and
a permanent magnet fixed to the other of said base and said movable stage.

9. The imaging apparatus according to claim 8, wherein each of said second thrust generator and said third thrust generator comprises permanent magnets which are fixed to said front fixed yoke and said rear fixed yoke, and
wherein said permanent magnets, which are fixed to said front fixed yoke and said rear fixed yoke, are positioned so that opposite magnetic poles thereof are placed face-to-face.

10. The imaging apparatus according to claim 8, wherein said first thrust generator comprises:
permanent magnets which are fixed to said front fixed yoke and said rear fixed yoke; and
a drive coil which is fixed to said movable stage,
wherein said permanent magnets, which are fixed to said front fixed yoke and said rear fixed yoke, are positioned so that same magnetic poles thereof are placed face-to-face.

11. The imaging apparatus according to claim 8, wherein said first thrust generator comprises:
piezoelectric elements which are provided at different positions between said movable stage and said image sensor, said piezoelectric elements configured to contract and expand in said first direction to thereby move said image sensor toward and away from said movable stage.

12. The imaging apparatus according to claim 8, further comprising:
position detectors which detect a position of said movable stage relative to said base at different positions on said movable stage; and
a processor which calculates translation positions of said movable stage relative to said base in said first direction, said second direction and said third direction and rotational positions of said movable stage relative to said base about said first direction, said second direction and said third direction.

13. The imaging apparatus according to claim 1, wherein said base comprises a front fixed yoke and a rear fixed yoke which face said movable stage from front and rear thereof along said first direction, and
wherein said thrust generator comprises:
a drive coil which is fixed to said movable stage; and
a permanent magnet which is fixed to at least one of said front fixed yoke and said rear fixed yoke.

14. The imaging apparatus according to claim 13, wherein said thrust generator holds said movable stage in a levitation state with respect to said front fixed yoke and said rear fixed yoke by interaction of said thrust forces in said different directions.

15. The imaging apparatus according to claim 1, wherein said base comprises a front fixed yoke and a rear fixed yoke which face said movable stage from front and rear thereof along said first direction, and
wherein said thrust generator comprises:
a drive coil which is fixed to at least one of said front fixed yoke and said rear fixed yoke; and
a permanent magnet which is fixed to said movable stage.

16. A stage apparatus comprising:
a base;
a movable stage configured to move relative to said base; and
a thrust generator which generates thrust forces in different directions against said movable stage, wherein, during operation of the thrust generator, an interaction of said thrust forces against said movable stage in at least one of said different directions holds said movable stage in a noncontact state with said base and causes said movable stage to at least one of:
translate relative to said base,
rotate relative to said base,
translate while rotating relative to said base, and
rotate while translating relative to said base.

17. The stage apparatus according to claim 16, wherein said different directions include a first direction, a second direction and a third direction, said first direction being parallel with a direction of an optical axis of said photographing optical system, and
wherein an interaction of said thrust forces against said movable stage causes said movable stage to at least one of:
translate relative to said base in said first direction,
translate relative to said base in said second direction,
translate relative to said base in said third direction,
rotate relative to said base about said first direction,
rotate relative to said base about said second direction, and
rotate relative to said base about said third direction.

18. The stage apparatus according to claim 17, further comprising:
position detectors which detect a position of said movable stage relative to said base at different positions on said movable stage; and
a processor which calculates positions of said movable stage relative to said base in said first direction, said second direction and said third direction and rotational positions of said movable stage relative to said base about said first direction, said second direction and said third direction.

19. A stage apparatus comprising:
a base;
a movable stage configured to move relative to said base; and
a thrust controller which controls a thrust force in different directions against said movable stage,
wherein, during operation of the thrust controller, an interaction of said thrust forces, which are controlled by said thrust controller, holds said movable stage in a noncontact state with said base and causes said movable stage to at least one of:
translate relative to said base,
rotate relative to said base,
translate while rotating relative to said base, and
rotate while translating relative to said base.

* * * * *